(12) United States Patent
Pettegrew et al.

(10) Patent No.: US 9,420,177 B2
(45) Date of Patent: Aug. 16, 2016

(54) PANORAMIC VIEW IMAGING SYSTEM WITH LASER RANGE FINDING AND BLIND SPOT DETECTION

(71) Applicant: IEC Infrared Systems LLC, Middleburg Heights, OH (US)

(72) Inventors: Richard Pettegrew, Cleveland, OH (US); John Paximadis, Cleveland, OH (US)

(73) Assignee: IEC Infrared Systems LLC, Middleburg Heights, OH (US)

( * ) Notice: Subject to any disclaimer, the term of this patent is extended or adjusted under 35 U.S.C. 154(b) by 0 days.

(21) Appl. No.: 14/865,799

(22) Filed: Sep. 25, 2015

(65) Prior Publication Data

US 2016/0105609 A1    Apr. 14, 2016

Related U.S. Application Data

(60) Provisional application No. 62/062,310, filed on Oct. 10, 2014.

(51) Int. Cl.
| | |
|---|---|
| *H04N 5/232* | (2006.01) |
| *G06T 5/50* | (2006.01) |
| *H04N 5/225* | (2006.01) |
| *G01C 3/08* | (2006.01) |
| *G01S 17/42* | (2006.01) |
| *G01S 7/48* | (2006.01) |

(52) U.S. Cl.
CPC ............. *H04N 5/23238* (2013.01); *G01C 3/08* (2013.01); *G01S 7/4808* (2013.01); *G01S 17/42* (2013.01); *G06T 5/50* (2013.01); *H04N 5/2256* (2013.01); *H04N 5/2259* (2013.01); *H04N 5/23296* (2013.01); *G06T 2207/20221* (2013.01)

(58) Field of Classification Search
CPC .......... H04N 5/23238; H04N 5/23296; H04N 5/2259; G03B 37/02
See application file for complete search history.

(56) References Cited

U.S. PATENT DOCUMENTS

| | | | |
|---|---|---|---|
| 2006/0238617 A1* | 10/2006 | Tamir ............... | G08B 13/19606 348/143 |
| 2009/0160936 A1* | 6/2009 | McCormack .... | G08B 13/19689 348/143 |
| 2011/0157386 A1* | 6/2011 | Ishii ...................... | H04N 5/232 348/211.4 |

(Continued)

OTHER PUBLICATIONS

U.S. Appl. No. 14/865,483, filed Sep. 25, 2015.

(Continued)

*Primary Examiner* — W B Perkey
(74) *Attorney, Agent, or Firm* — Eschweiler & Associates, LLC

(57) ABSTRACT

Example systems and methods acquire individual frames under a variety of different operating parameters. Example systems and methods then piece together strips of frames from the individual frames. Example systems and methods then produce a panoramic image from the strips of frames. Frames are acquired using different imaging parameters (e.g., focal length, pan position, tilt position) under different imaging conditions (e.g., temperature, humidity, atmospheric pressure, pan rate, tilt rate). Range information is acquired and associated with different locations (e.g., pixels) in frames. Range information may be acquired for some locations and estimated for other locations. Blind spots in a scene may be identified. Range information may then be retrieved quickly from the panoramic image or from a data structure associated with the panoramic image without having to find the range again.

34 Claims, 24 Drawing Sheets

(56) References Cited

U.S. PATENT DOCUMENTS

2012/0062695 A1\* 3/2012 Sakaki ............. G08B 13/19691
                                                            348/36
2012/0243746 A1\* 9/2012 Higashimoto ..... H04N 5/23238
                                                            382/106
2015/0055886 A1\* 2/2015 Oh ........................ G06T 3/4038
                                                            382/284

OTHER PUBLICATIONS

U.S. Appl. No. 14/865,621, filed Sep. 25, 2015.
U.S. Appl. No. 14/865,939, filed Sep. 25, 2015.

\* cited by examiner

PANORAMIC VIEW IMAGING SYSTEM WITH LASER RANGE FINDING AND BLIND SPOT DETECTION

CROSS-REFERENCE TO RELATED APPLICATIONS

This application claims the benefit of U.S. Provisional Application 62/062,310 filed Oct. 10, 2014.

BACKGROUND

Determining line of sight (LOS) and range to a target are frequent problems in security and military applications. Determining the LOS available to a user based on a top-down, topographical map may be a time-consuming and error-prone task. Subtle or drastic changes in elevation can create areas to which a user does not have an LOS. Such areas, or blind spots, may provide locations where intruders can hide or crawl to go un-noticed. Such areas may also provide routes from which an intruder can approach or even penetrate a perimeter. For example, a region mapped on a topographic map with five meter contour lines may appear, on the map, to be flat and exposed, and thus not a likely route for intruders. However, a three meter deep gully may meander through the region, providing an approach route that is invisible on the map because the three meter depth of the gully is smaller than the map's five meter "resolution" can resolve. Similarly, a panoramic image provided from a panoramic imaging device may also not display the gully, especially if the terrain is covered in a relatively uniform material (e.g., grassy plains, desert scrub, snow), or if the image is a relatively low resolution thermal image. Thus, conventional approaches to deploying limited resources (e.g., guards, soldiers, sentries, imaging devices) in a security or military situation based upon determining LOS from a topographical map may leave the gully unobserved, and may create a false sense of security.

Many cameras take panoramic images that are adequate for remembering a scene from vacation. While the panoramic image may be suitable for recalling a vacation moment, the panoramic image is unsuitable for security or military related applications where potentially life and death decisions concerning the delivery of ordinance or other active measures or countermeasures may need to be made in real-time. Conventional panoramic images tend to be acquired along a single axis and contain just the color or intensity information needed to display a digital version of the panoramic image. Conventional panoramic images do not contain accurate range information associated with objects in the image. Determining a range from a security or surveillance system to an object represented in an image acquired by the system is a difficult, if even possible, problem to solve, particularly in a tactically useful timeframe. While a human may be able to estimate a range to a target imaged in a panoramic visual or thermal image, the estimate is unlikely to be accurate enough to effectively or usefully guide ordinance or other resources to the target.

A panoramic imaging system may acquire multiple images (e.g., digital photographs) that when processed into a single image provide a larger field of view than is available in a single image. Conventionally there have been different approaches for acquiring the multiple images that are processed together into a single image that has a larger field of view. Regardless of how the multiple images are processed into the single image, the single image still tends to include just the color or intensity information needed to display a digital version of the panoramic image. These panoramic views have typically been unsuitable for certain military applications where real-time decisions need to be made based on surveillance imagery. In particular, these panoramic views typically lack reliable range information, if they contain any range information at all.

Conventional "staring" type cameras may operate in conjunction with a laser range finder co-aligned with the image data capture apparatus of the staring camera. However, conventional approaches that align a laser range finder with a static, staring camera are not practical if the camera needs to rotate, which panoramic imaging systems typically need to do. While rotation can be stopped to take a reading, a conventional system is not detecting targets in other directions when it is stopped. Thus, conventional systems that stop scanning to take range readings leave the remaining area of interest unwatched and open to exploitation.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa.

Furthermore, elements may not be drawn to scale.

DETAILED DESCRIPTION

Figure 1:
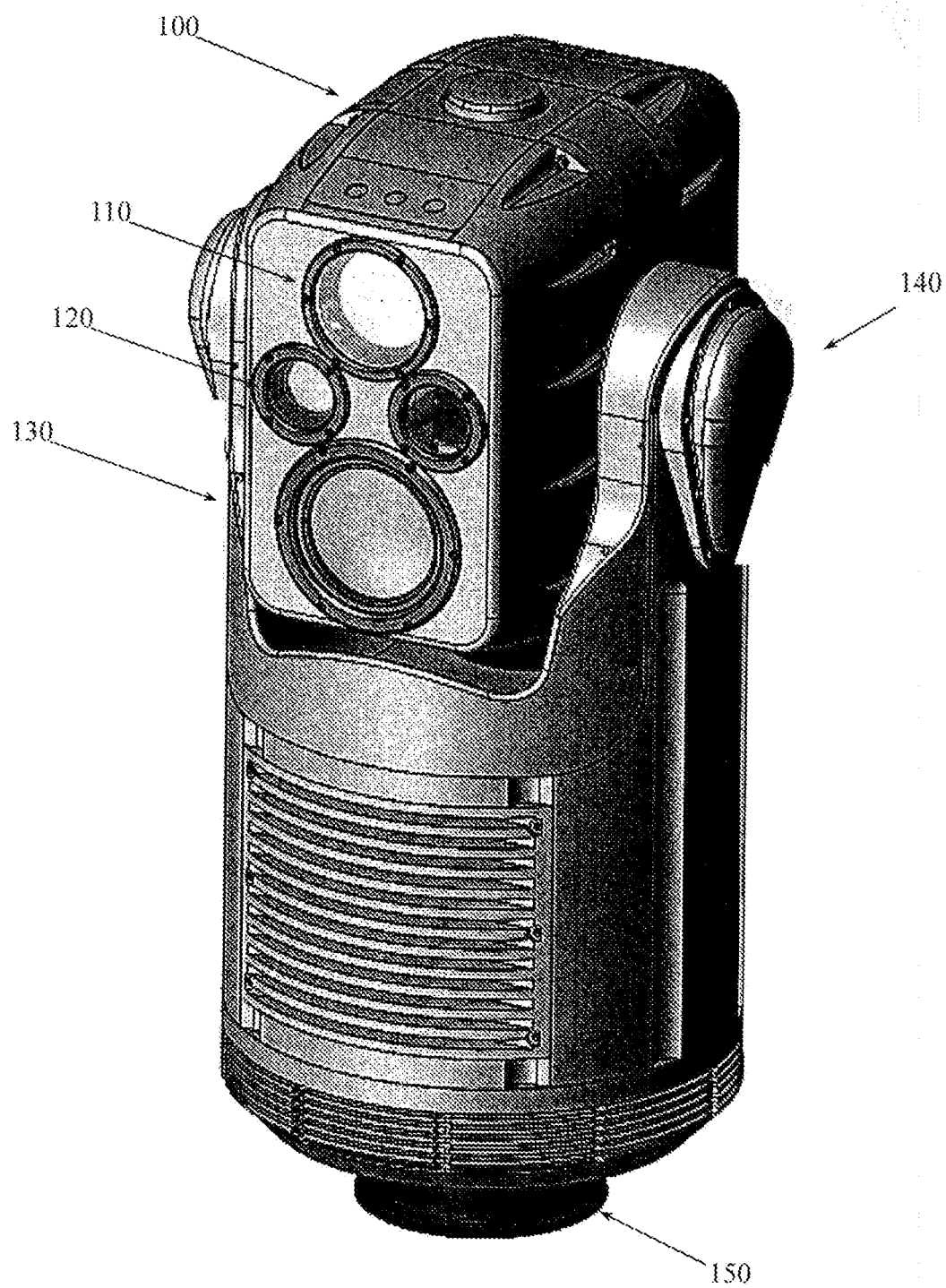
FIG. 1 illustrates an example panoramic imaging system.

Example systems and methods provide a panoramic view imaging system (PVIS) that provides imagery suitable for security applications (e.g., military) where accurate range information, line of sight (LOS) and/or blind spot information is considered. Example systems and methods provide, in real-time or substantially in real-time, an image compiled from a collection of frames, where the compiled image has a greater field of view (FOV) than the individual frames and where more data than just the color or intensity needed to digitally display the panoramic view image is acquired and stored. The additional data may include, for example, range data acquired using a laser range finder that is part of or otherwise associated with the PVIS. In one embodiment, a laser in a laser range finding device may be co-axially mounted with an image acquisition assembly in a PVIS.

Example systems and methods produce a panoramic image that may be integrated with other imagery (e.g., satellite overhead view, topographical map, GPS data). Integrating a panoramic image from an example PVIS with range data facilitates identifying blind spots. Example systems and methods also facilitate a reverse-LOS check to be made from locations for which range data has been gathered.

The frames acquired by the PVIS may be digital images of a portion of a scene. Example systems and methods may capture multiple frames of portions of a scene at multiple azimuth and elevation positions using multiple fields of view or multiple zoom levels under different operating conditions while being panned or tilted from position to position at various rates or accelerations. This facilitates improving upon conventional systems where a single lens and single sensor may maintain a fixed relationship and may operate under substantially uniform operating conditions. Example systems and methods may also acquire range information for locations in the frames. In one embodiment, range information may be acquired for every pixel in a frame. In other embodiments, range information may be acquired for less than every pixel in a frame. In one embodiment, range information may be interpolated or estimated for some pixels based on actual range information from other pixels. Example systems and methods may determine for which pixels actual range information is to be acquired and for which pixels interpolated or estimated range information will be computed.

Example apparatus may include a number of lenses and sensors, may change relationships between the lenses and sensors, and may operate under a wide range of operating conditions. For example, a PVIS may produce real-time imagery from a unit that is spinning at sixty revolutions per minute, that is being tilted while spinning, that is simultaneously collecting electromagnetic radiation in multiple spectra, and that is operating in temperature ranges from −40 C to 50 C, in humidity ranges from substantially zero percent to substantially one hundred percent, in atmospheric pressure ranges from less than one atmosphere to more than one atmosphere, and in varying light conditions. In one embodiment, light conditions may be artificially altered by, for example, smoke or other materials that intentionally obscure a scene.

Operating a PVIS under this wide variety of operating conditions for security applications may present challenges that are not encountered in single point of view static imaging or conventional panoramic imaging.

FIG. 1 illustrates an example panoramic imaging system 100. System 100 may include a visual light acquisition assembly 110, a laser range finding apparatus 120, and a second (e.g., thermal, IR, UV) imaging assembly 130. System 100 may be panned using assembly 150 and may be tilted using assembly 140. Different panoramic imaging systems may include different numbers and types of sensors arranged in different configurations. Panning assembly 150 and tilting assembly 140 are representative and other panning apparatus or tilting apparatus may be employed. Panning assembly 150 may also be referred to as a rotational position controller. Panning assembly 150 may include an azimuthal position encoder or rotational position encoder that measures the azimuthal position at which a frame is acquired. Tilting assembly 140 may also be referred to as an elevation position controller. Tilting assembly 140 may include an elevation position encoder that measures the elevation position at which a frame is acquired. Panning system 100 using assembly 150 adjusts the azimuth of system 100. Tilting system 100 using assembly 140 adjusts the elevation of system 100. Azimuthal or elevation positions may be acquired and associated with a frame when the frame is acquired. Range data that is acquired may be associated with the azimuthal or elevation positions.

System 100 may also include a zoom controller that changes the focal length of the visual light acquisition assembly. System 100 may also include an image processor that produces a panoramic image from a plurality of frames produced by the visual light frame acquisition assembly under varying operating parameters. The panoramic image has a field of view greater in both a horizontal dimension and a vertical dimension than a single frame acquired by the visual light acquisition assembly. The panoramic image is produced without using a hemispherical mirror or a fisheye lens.

In one embodiment, a laser in laser range finding apparatus 120 may be co-axially mounted with an image acquisition assembly in PVIS 100. Laser range finding apparatus 120 acquires range data for a point defined by the azimuthal adjustment and elevation adjustment of system 100. Laser range finding apparatus 120 may acquire range data for an array of points. System 100 may use range data acquired by laser range finding apparatus 120 to associate, via interpolation or extrapolation, range information corresponding to a frame position or a pixel position with an image acquired by system 100.

An image acquisition assembly may include a lens and a sensor. A lens has a focal length. Example systems and methods may change the focal length to facilitate zooming in or zooming out. Changing the zoom may change the FOV. For example, when zoomed all the way out, the FOV may have a first (e.g., larger) size and when zoomed all the way in may have a second (e.g., smaller) size. The focal length may be known for various configurations of lens and sensor. However, in the field, a PVIS may experience stressful operating conditions that may affect the actual focal length. For example, a PVIS may experience dramatic temperature changes during a day. In the high desert, at midday, temperatures may exceed 40 C while at night temperatures may fall below 0 C. Thus, significant thermal expansion or contraction may occur during a period of hours in a lens, a sensor, and the PVIS in which the lens and sensor are located. Example systems and methods may therefore use calibration data acquired under varying temperature, pressure, humidity, or other environmental conditions and a deployed unit may dynamically adapt its correction approach based on sensed conditions. Additionally, operating parameters (e.g., pan rate, pan acceleration rate) may produce mechanical forces that affect focal length or other properties. For example, a system that is spinning clockwise at 60 rpm may produce a first mechanical stress that subtly changes the orientation of the lens and assembly in a first way while a system that is spinning counterclockwise at 30 rpm may produce a second, different mechanical stress that subtly changes the orientation of the lens and assembly in a different way. Example systems and methods may account for these aberrations.

In the field, at startup, system 100 may automatically create an initial, static panoramic image at a pre-determined FOV (e.g., widest FOV available). This image may provide a user with a context that facilitates selecting working parameters for the current deployment of system 100. The working parameters may include, for example, a pan limit (e.g., azimuth range), a tilt limit (e.g., elevation range), initial grid resolutions, a range of grid resolutions, pan rate, tilt rate, and other information. The setup parameters may define a grid of angular locations at which frames will be acquired. Range information may be acquired for points on the grid of angular locations. System 100 may position the sensors to sample the scene at the angular locations. Sample frames acquired from the scene may be used to select image correction parameters from previously produced calibration data. While a widest FOV setting is described, startup parameters may be specified. The startup parameters may include, for example, initial angular scan limits, initial angular resolution of a grid to be used in imaging, initial FOV, or other parameters. The startup parameters may be entered in different ways including, for example, at a keyboard, using a pointing device (e.g., mouse, stylus, finger), verbally, or in other ways.

In the field, at startup, system 100 may automatically create a virtual spherical wire grid that includes range information for locations in the panoramic image. The spherical wire grid may be defined by the grid of angular locations. A user may designate system parameter values similarly to the entering of startup parameters described above. The system startup parameters may also be set automatically, using pre-set values, or through a pre-determined, factory default setting. Values for the azimuth range and the elevation range may be set using an onboard thermal camera that identifies sky, land, or water, or through automated image analysis of a visual image. The system startup parameters may also include location information to determine an absolute position of system 100. An absolute position may be defined using latitude, longitude, map co-ordinates, or height above sea level. The location information may be entered by a user, or may be automatically gathered by an onboard GPS system. Relative topographical and geolocation data can be generated without absolute position information, but, in the absence of absolute position information, the topographical and geolocation will be defined relatively on the location of system 100.

System 100 may automatically set the startup parameters. In one embodiment, system 100 may use a default azimuth range of three hundred and sixty degrees. To minimize the time required to complete an initial scan, system 100 may automatically determine the location of a sky-ground interface. A sky-ground interface may be, for example, the horizon, the skyline of a city, or a ridge line. In many situations, range data may not be needed for the sky and thus the sky does not need to be scanned with the laser range finder. For example, a laser range finder may have a maximum range of 10000 m. Lasing the sky may result in no range data and may waste time or energy. In one embodiment, system 100 may be equipped with a thermal camera, and a thermal image produced by the thermal camera may be analyzed to detect regions of thermal signal which are in a significantly low range. The thermal camera may be a part of second imaging assembly 130. System 100 may analyze the thermal image using a threshold filter. Regions within a significantly low thermal range may signify that the region corresponds to the sky. System 100 may also distinguish sky from land in the image using GPS data. System 100 may also distinguish sky from land based on a user input. For example, a user may control system 100 to scan the sky for only 5 degrees above the horizon, but not scan the remaining sky.

System 100 may define a grid of angular locations based on the startup parameters. An angular location may be defined by an azimuth and an elevation. System 100 positions the laser range finding apparatus 120 at an angular position defined in the grid. System 100 acquires a range for a point in the grid of angular locations using laser range finding apparatus 120. Upon acquiring a range for an angular position, system 100 may move to another angular position and continue acquiring range data. System 100 may acquire a range for all the points defined by the grid of angular locations, or may acquire a range for a subset of the points defined by the grid of angular locations. For example, system 100 may ignore locations corresponding to the sky, and not acquire range data from angular locations corresponding to the sky. System 100 may construct a virtual spherical wire grid or wire-frame model based on the acquired range data for the points in the grid of angular locations. Vertices in the virtual spherical wire grid may correspond with range data acquired for points in the grid. For example, a vertex in a virtual wire-frame model built from the virtual spherical wire grid may correspond to range information for a location in the frame. The virtual spherical wire grid may be represented graphically on a display, or may be stored in a data structure, memory, or other data storage device. The virtual spherical wire grid may be manipulated to facilitate determining an LOS from the location of apparatus 100, or for determining a reverse-LOS from other points defined by the virtual spherical wire grid.

System 100 also determines a difference in range between a pair of neighboring points in the grid of angular locations. System 100 determines the difference in range between a first neighboring point and a second, different neighboring point. The points may be neighboring in azimuth, or in elevation, or in both azimuth and elevation. If the difference is greater than a selected spatial resolution or range resolution, system 100 calculates an angular position for a third point that bisects the angle described by the ray to the first neighboring point, the location of system 100, and the ray to the second neighboring point. The selected spatial resolution may be a range difference threshold defined by a user at setup, defined as a factory default, or automatically set by system 100. In one embodiment, the range difference threshold may be 10 m, 100 m, 1000 m, or another value measured in meters or other units. The angular position for the third point may be an angular position between the first neighboring point and the second, different neighboring point, or may be an angular position that bisects the angle described by the ray to the first neighboring point, the location of system 100, and the ray to the second neighboring point equally. System 100 acquires a range for the third, bisecting point.

System 100 may also check the angular difference between the third, bisecting point and the first neighboring point and the second neighboring point. If the angular difference between the third, bisecting point and the first neighboring point and the second neighboring point is within the selected angular resolution, laser range finding apparatus 120 acquires the range of the third, bisecting point. The selected angular resolution may be an angular distance threshold. In one embodiment, the angular distance threshold may be 0.1 degrees, 0.5 degrees, or another value. The angular distance threshold may be measured in degrees, radians, or other units. If the angular difference is greater than the angular resolution, system 100 controls the rotational position and elevation position to position laser range finding apparatus 120 to the nearer point (e.g., the first neighboring point or the second neighboring point), and acquires the range. System 100 thus adaptively scans in both azimuth and elevation until the specified range resolution is met, or the specified angular resolution is met, or until a user defined terminating condition or a default terminating condition is met. For example, a user may define a maximum number of attempts at meeting the specified angular resolution or specified range resolution at a given point that system 100 will attempt before moving on to another point, or a user may define a time limit at which point system 100 stops adaptively gathering range data. System 100 may selectively adapt the range information associated with the plurality of locations in the panoramic image based, at least in part, on the range information for the third, bisecting point.

In one embodiment, system 100 generates range data for a pixel or a location in a frame in a panoramic image corresponding to a point in the grid of angular locations. System 100 angularly matches the grid points ranged by the laser range finder 120 to corresponding grid points in the panoramic image. System 100 may angularly match range and image data using image data in an image acquired by a conventional staring camera, from a panoramic image acquired by a PVIS as described herein, or from an image acquired by another imaging system.

Figure 3:
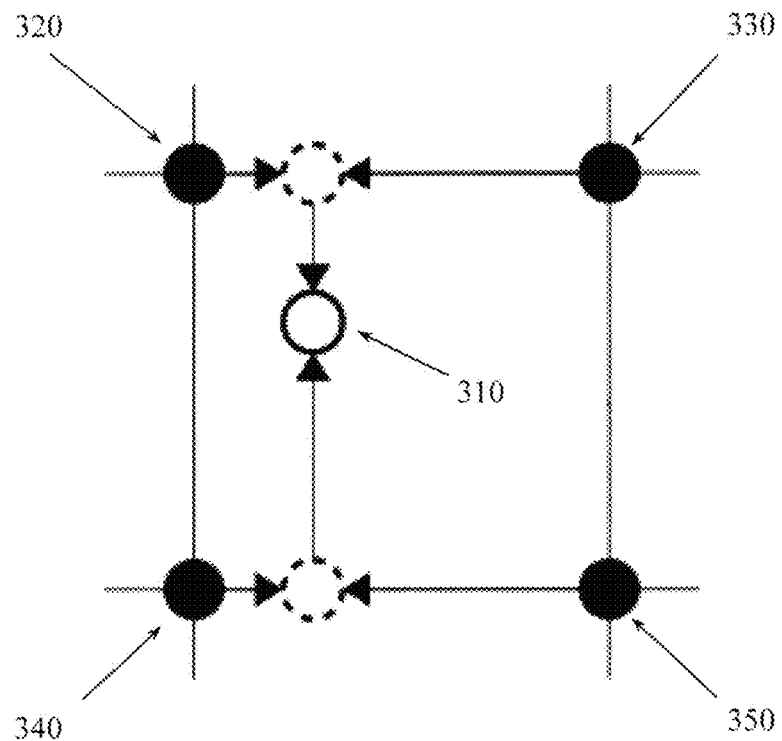
FIG. 3 illustrates an example of linear interpolation.

System 100 may estimate range information for points in the panoramic image that do not have associated range information. System 100 may estimate the range information using a flat-earth model, user-supplied elevation data, GPS data, or interpolation based on points in the panoramic image that have associated range information. In one embodiment, system 100 uses linear interpolation to compute range data for points in the panoramic image that lie between points in the grid of angular locations that were ranged by the laser range finding apparatus 120. FIG. 3 illustrates linear interpolation of a point 310 between points 320, 330, 340, and 350. In this example, azimuth, elevation, and range data is known for points 320, 330, 340, and 350. For point 310, azimuth and elevation are known, but range is unknown. System 100 uses linear interpolation to compute a range for point 310. In another embodiment, other types of interpolation, including polynomial interpolation, spline interpolation, nearest neighbor interpolation, trigonometric interpolation, multivariate interpolation, or a Gaussian process, may be used to compute an estimated range for point 310.

In some situations, portions of the panoramic image may correspond to physical locations beyond the range of the laser rangefinder. For example, a mountain 40 km distant from the system 100 may appear in the panoramic image, but may be 35 km out of range of the laser range finder 120. For a pixel in a location beyond the range of the laser range finding apparatus 120, system 100 may estimate a range. System 100 may estimate a range using a flat-earth model, in which the imaging system's height, which was previously entered as a setup parameter, and a look-down angle are used to project the target range. A geolocation for the target may also be derived from the known position of system 100, either absolute, or relative. System 100 may also estimate the range of portions of the panoramic image outside the range of laser range finding apparatus 120 using information provided by a GPS system, from a map, or from user input.

In one embodiment, system 100 assigns a range value to points in the grid of angular locations corresponding to the sky without actually lasing the sky. System 100 may assign a constant value to all the points corresponding to the sky. For example, laser range finder 120 may have a maximum effective range of 10 km. In this example, system 100 may be tasked with surveilling approaches to a harbor, where visibility to the horizon (e.g. water-sky interface) is 5 km. A user may configure system 100 to acquire range information for points that have an elevation value that positions the points at or below the water-sky interface. System 100 may also assign points in the sky an arbitrary, default, or user defined range value. In this example, the user controls system 100 to assign points in the sky a range value of 5 km. In other examples, other range values could be selected. In this example, points in the sky are assigned a range of 5 km because the user has no capability to inspect or deliver ordinance to any object or location beyond 5 km. Other ranges may be assigned. For example, the sky may be assigned the maximum range of the laser range finding apparatus 120.

System 100 stores the data acquired by the laser range finding apparatus 120. System 100 may store measured ranges, ranges calculated by interpolation, estimated ranges, and other data in a data structure stored in a memory or in a data storage device. The memory or the data storage device may be included in system 100, or may be located in a different location. For example, system 100 may have a wired connection to a reconnaissance vehicle located several hundred meters from system 100 and may store the data acquired by laser range finding apparatus 120 in the reconnaissance vehicle. In another example, system 100 may be located on a beach, and may be connected wirelessly to a data storage device located in a ship located off shore. In one embodiment, system 100 stores the data acquired by the laser range finding apparatus 120 in a data structure. The data structure may be an array, a look-up table, a list, or other data structure. System 100 may embed the data acquired by laser range finding apparatus 120 in the panoramic image. By storing the range data in a data structure or in the panoramic image and facilitating access to the range data independently of acquiring new range data, system 100 improves on conventional approaches that may require lasing a location in a scene whenever a user wants range information about the location in the scene. Instead of having to lase the location, the range information may already be retrievable, substantially instantaneously, and certainly in a tactically relevant timeframe, from the panoramic image or the data structure.

In one embodiment, system 100 may include a graphical user interface (GUI). The GUI may display the panoramic image. A user may interact with the GUI to request range data for a location in the panoramic image. For example, the GUI may include a touch screen interface, and a user may touch the location on the image for which the user desires range data. Other types of GUI may be employed.

The GUI may be used to interact with other systems (e.g., drones, manned aircraft, satellites, artillery) operably connected to system 100. For example, a user may request range information for a point associated with a location in the image that appears to illustrate a formation of trucks at a range of 2000 m. The user may highlight the formation of trucks by tapping on the image, mousing over the image, or otherwise selecting the trucks. The user may then indicate a virtual point that appears, from the perspective of the user to be 50$m$ vertically above the trucks. System 100 may be controlled to compute a geo-location for the virtual point directly above the trucks, rather than the point that corresponds to the pixel in the image that appears to be beyond the range of the trucks from system 100. In this example, system 100 then communicates the geo-location of the virtual point directly above the trucks to an orbiting aircraft, which is instructed to deliver ordinance to the point directly above the trucks.

In one embodiment, system 100 may pan (e.g., move in a horizontal plane, move in azimuth) to provide three hundred and sixty degrees of horizontal coverage and tilt (e.g., move in a vertical plane, move in elevation) to provide at least one hundred and eighty degrees of vertical coverage. In one embodiment, system 100 may also rotate around a horizontal or vertical axis. System 100 may acquire images from a lens and sensor assembly that moves through multiple degrees of freedom to pan and tilt. With this range of pan and tilt available, system 100 may acquire images that cover all or a portion (e.g., hemisphere) of a sphere centered at the location of system 100. Thus, system 100 produces a panoramic view that facilitates providing superior situational awareness for a viewer. The expansive situational awareness may be appropriate for security applications including, for example, military surveillance, police surveillance, prison perimeter monitoring, embassy protection, power plant protection, or other applications.

System 100 may have multiple different sensors (e.g., cameras) that acquire electromagnetic radiation in multiple spectra to produce multiple types of images. In one embodiment, system 100 may acquire electromagnetic radiation using visible spectra sensors, infrared (IR) spectra sensors, ultraviolet (UV) spectra sensors, laser range finding sensors, and other sensors. In one embodiment, different types of images may be combined or overlaid to produce images that provide a more complete view of a scene. Using multiple imaging modalities in multiple spectra (e.g., visible, infrared) facilitates providing a day/night, all-weather surveillance capability.

System 100 may acquire range information more than once for a frame. For instance, at setup, system 100 may acquire range data for a set of points in the angular grid. At a second, later time, system 100 may acquire range data again for the set of points in the angular grid. System 100 may then produce a movement alert upon detecting a change in a range associated with an object in a first instance of a first frame acquired at a first time and a second instance of the first frame acquired at a second time. Acquiring range data at different times allows system 100 to detect changes in the scene. For example, at setup, system 100 may acquire initial range data for what appears to be a haystack at 1000 m. At a second time, system 100 detects, upon acquiring range data for the point in the angular grid associated with the haystack, that the range to the haystack has changed to 950 m. System 100 may then direct a user to devote more attention or resources to monitoring the moving haystack. Acquiring range data at different points in time facilitates more accurate surveillance of a scene than can be performed by just acquiring range data once, or by merely visually surveying the scene.

Producing a panoramic view, or providing wide-area imagery, involves a tradeoff between the spatial extent of the FOV that is observed and the range at which a target of a given size can be resolved. For example, a camera having a FOV of 12 horizontal degrees and 9 vertical degrees at a certain zoom level may be able to resolve a target sufficiently to detect an upright soldier at a range of 1500 m. However, another camera having a FOV of 4 horizontal degrees and 3 vertical degrees and a tighter zoom level might be able to detect and resolve the same solider at a range of 3500 m. While more space can be imaged with the FOV of 12/9 and the lesser zoom, the items in the view would be smaller and thus harder to distinguish. While less space can be imaged with the FOV of 4/3, the items in the view would be more magnified and thus easier to distinguish. System 100 may store image data at different FOV for the same position in the angular grid in a memory or computer-readable medium in an example PVIS. A user may select a location in a panoramic image at a 12/9 FOV and request an image of the location at 4/3 FOV. System 100 may display the stored 4/3 image without having to reacquire imagery of the location, or without having to re-aim at the point. System 100 may thus provide more useful detail to a user than conventional software zoom applications. System 100 may also provide range information for the panoramic image regardless of the FOV.

Figure 2:
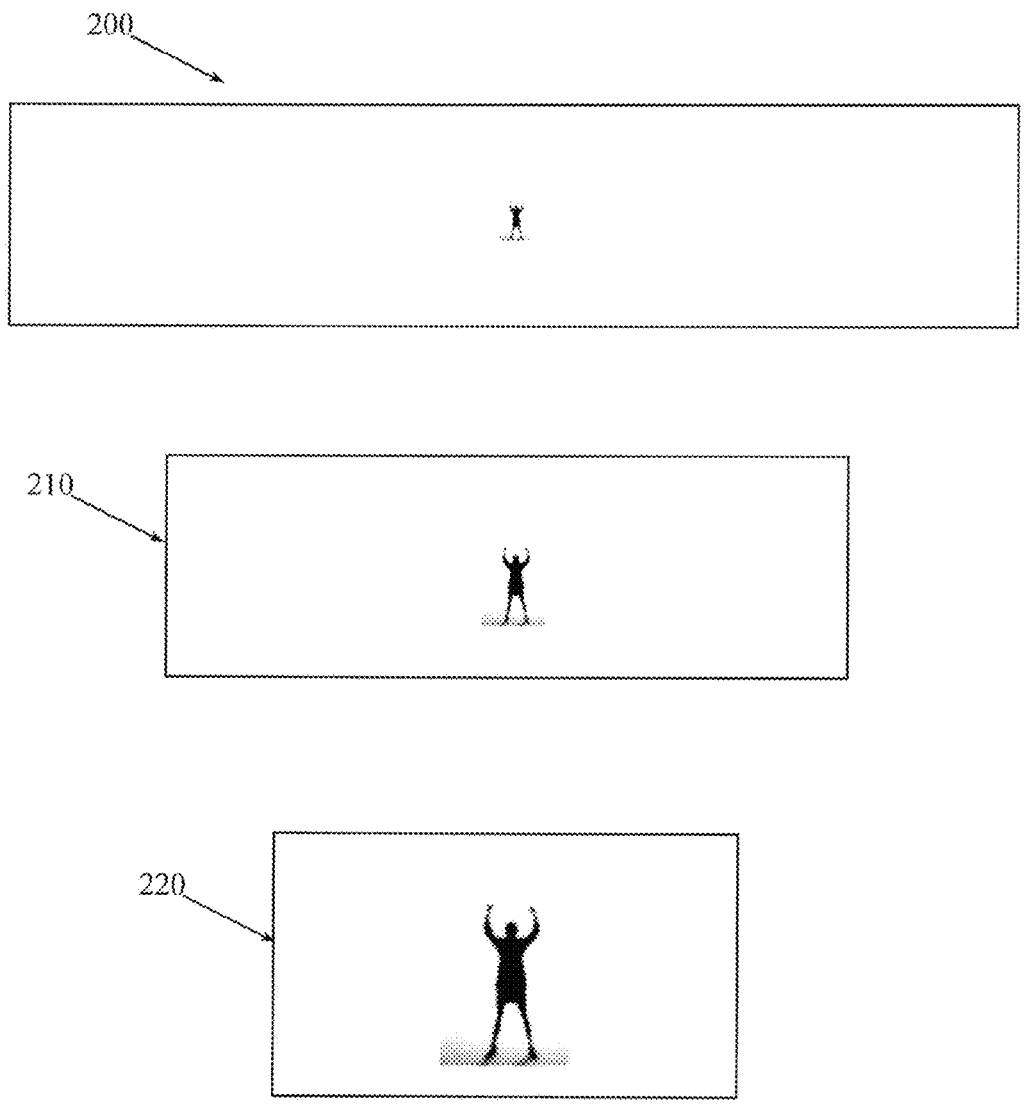
FIG. 2 illustrates frames with different fields of view and resolution.

FIG. 2 illustrates a first image 200 that has a first field of view and zoom level. It may be difficult, if even possible at all, to resolve or even detect a figure standing in image 200. FIG. 2 also illustrates a second image 210 that has a smaller field of view and a higher zoom level. It may be more possible, but still difficult to resolve or detect a figure standing in image 210. FIG. 2 also illustrates a third image 220 that has a smallest field of view and greatest zoom level. It may be possible to resolve the figure standing in image 220. Producing a panoramic image from frames with the FOV and zoom level of image 200 would take less time than producing a panoramic image from frames with the FOV and zoom level of image 220, but the resulting image would have less magnification. Regardless of the zoom level, the range information may be available by interacting with (e.g., touching) the panoramic image.

Example cameras may acquire raw image data. Raw image data may be used to produce a series of individual frames of various portions of a scene. Raw image data may have anomalies that result from aberrations in lenses or sensors used to acquire the raw image data. The raw image data may be corrected using data acquired during a calibration process. In one embodiment, the raw image data is de-warped to produce de-warped individual images.

An individual frame is de-warped by performing a transform on stored electronic data. The stored electronic data is transformed using pre-determined coefficients that stretch the frame from a warped appearance back to a correct shape. The coefficients may be available from a previously performed calibration process. De-warping raw image frames addresses the inherent warping of image edges that occurs when a 3D scene is projected onto a 2D plane. Correcting raw image frames addresses anomalies that may result from aberrations in lenses or sensors. Raw image frames may be corrected (e.g., de-warped) before being made available for stitching into a strip of frames.

A scene that is imaged, and for which range information is acquired, may include blind spots. A blind spot may be a location in a three dimensional volume imaged by a PVIS that cannot be seen on a two dimensional representation of the three dimensional volume. In one example, a blind spot is a location where system 100 cannot form an image of the ground. In another example, a blind spot is a location for which system 100 is unable to acquire range information.

System 100 may calculate blind spots by converting a range data to a geo-located position. System 100 may calculate blind spots using range data acquired using range finder 120, interpolated range data, or estimated range data. Blind spots may be calculated in absolute co-ordinates, including latitude or longitude, or other types of co-ordinates. Blind spots may be calculated in relative co-ordinates based on the location of system 100 used as a relative reference point. For example, system 100 may center a map on the location of system 100.

To determine a blind spot, system 100 converts range data from a point in the image into a geo-located position. A geo-located position may be a position represented by a map co-ordinate system, a GPS co-ordinate system, latitude and longitude, or other co-ordinate system. System 100 may convert the range data using a right-triangle calculation, in which the range acquired by laser range finding apparatus 120 is the hypotenuse of the triangle, and the look-down angle is the elevation position, or the angle between the vertical side of the triangle and the hypotenuse. The vertical side may be the height of the system 100 above the ground. For example, system 100 may be situated on a mast such that the center of laser range finding apparatus 120 is 4 m above the ground. The energy emitted from the laser range finder in laser range finding apparatus 120 may strike an object, determining a range of 100 m. System 100 may then calculate the target's elevation, and the lateral range of the target from the location of the system 100 using the look-down angle, the range, and the height of system 100. System 100, knowing the lateral range of the target from the location of system 100, may then associate the location of the target, based on the range, the lateral range, or the azimuth, with a geo-location on a map. If the absolute location of system 100 is known, then the actual location of a blind spot in absolute co-ordinates can be determined. System 100 may also calculate a relative location of a blind spot based on the relative location of the system 100. In another embodiment, system 100 may employ other techniques to convert range data to a geo-location.

Figure 4:
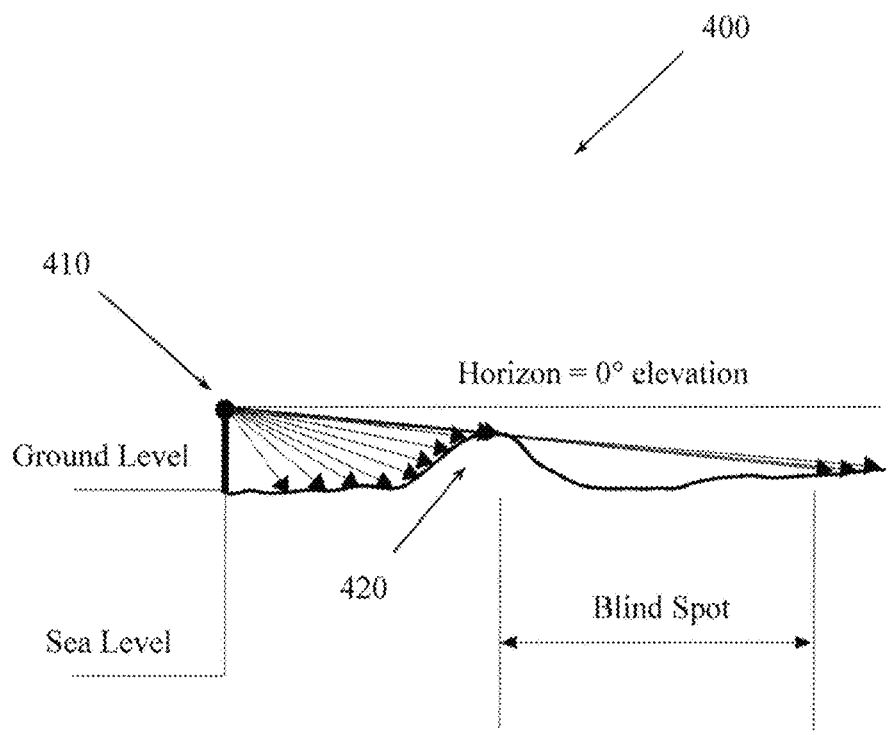
FIG. 4 is an example side-view of a blind spot.
Figure 5:
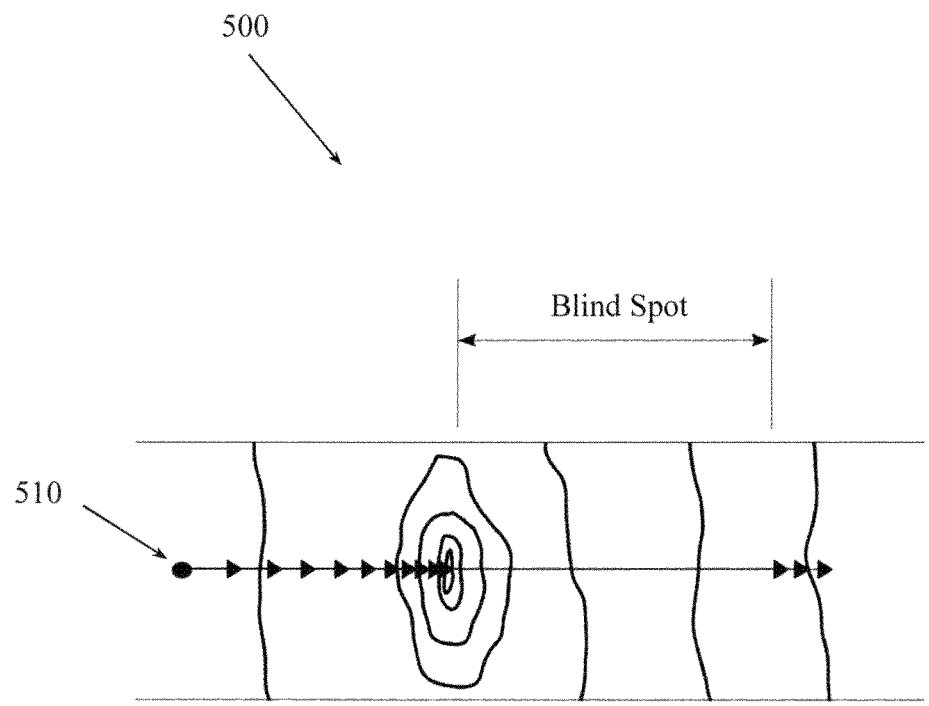
FIG. 5 is an example overhead view of a blind spot on a topographic map.
Figure 6:
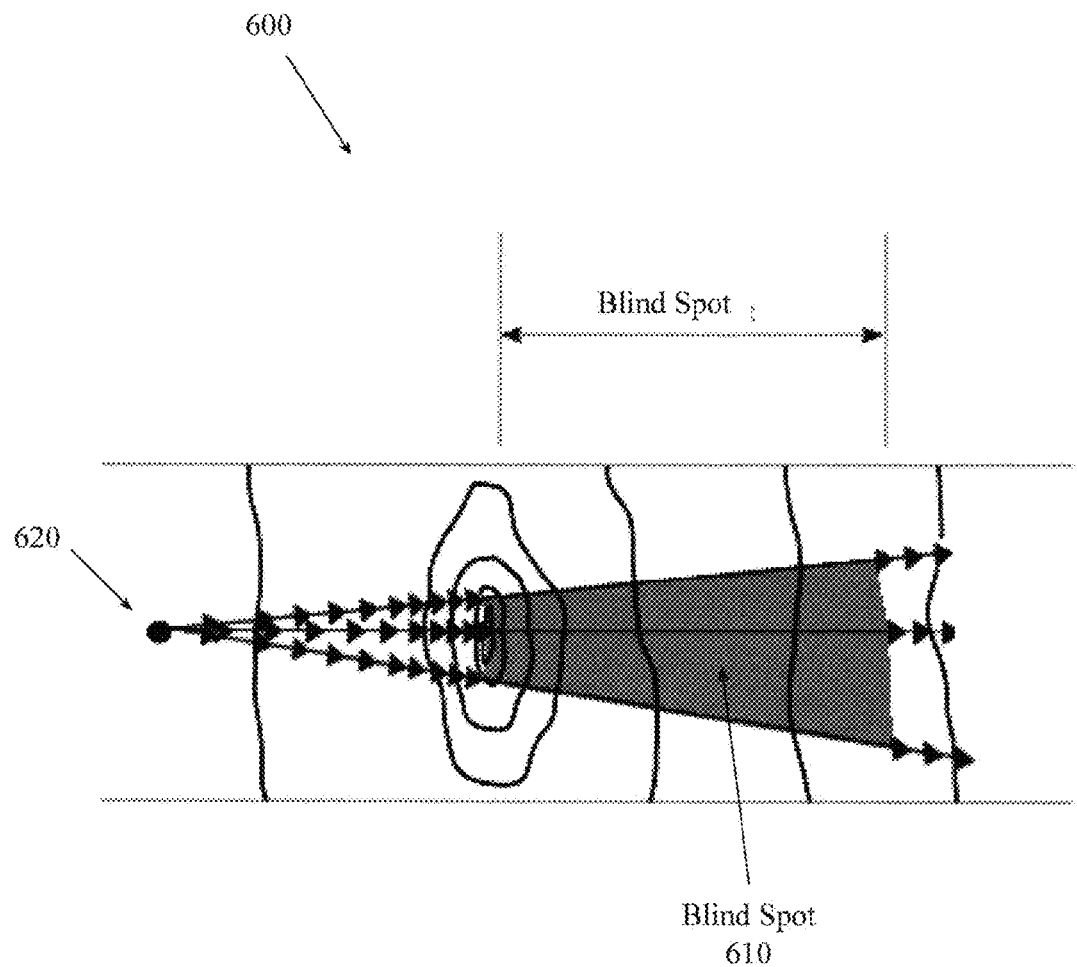
FIG. 6 is an example overhead view of a blind spot on a topographic map.
Figure 7:
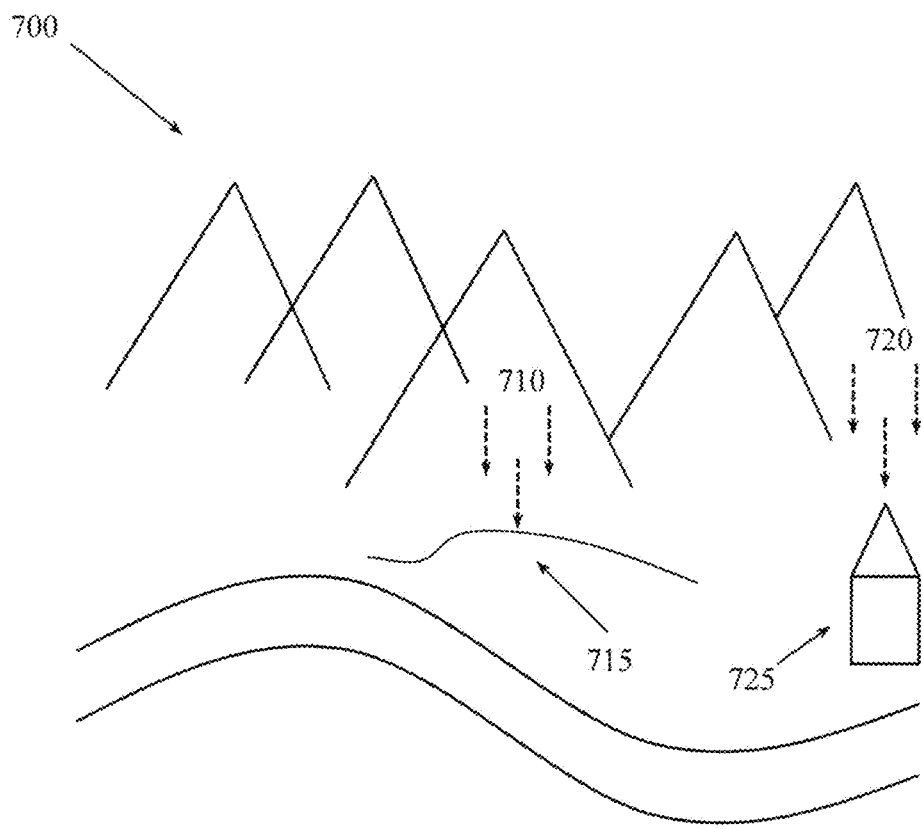
FIG. 7 illustrates a panoramic image with blind spots highlighted.

System 100 plots the geo-location of points in the panoramic image to a two-dimensional map. Locations on the map that do not have geo-location data associated with points in the panoramic image are defined as blind spots. Blind spot locations may be highlighted on the map. System 100, upon computing a blind spot location, may also associate a blind spot with a location in the panoramic image. System 100 may highlight a blind spot location in the panoramic image. FIG. 4 illustrates a side view of a blind spot. FIG. 4 shows multiple elevation scans from a PVIS 410 at a single azimuth. FIG. 5 illustrates an overhead, or topographical, view of a blind spot. FIG. 5 shows multiple elevation scans of the same region illustrated in FIG. 4 from a PVIS 510 at a single azimuth. FIG. 6 is similar to FIG. 5, but shows multiple elevation scans from a PVIS 620 of the same region at three different azimuths, and shows a highlighted region 620 indicating the blind spot. FIG. 7 illustrates an example panoramic image that highlights blind spots. In FIG. 7, a hill 715 may cause a blind spot that is highlighted by arrows 710. In FIG. 7, a house 725 may cause another blind spot that is highlighted by arrows 720. System 100 may indicate on a display an area of a blind spot, a dimension of the blind spot, or other information associated with the blind spot.

By providing a representation of blind spots in a tactically relevant time frame, example systems and methods have the concrete, real-world effect of increasing the efficiency of personnel and resource deployment in military and security applications. When blind spots are known, costly and limited resources may be more efficiently deployed to monitor the blind spots. For instance, soldiers on the ground may be directed to monitor a blind spot visually, or a drone may be directed to move to a position where it has an LOS to the blind spot. Example systems and methods thus improve on conventional approaches.

Figure 8:
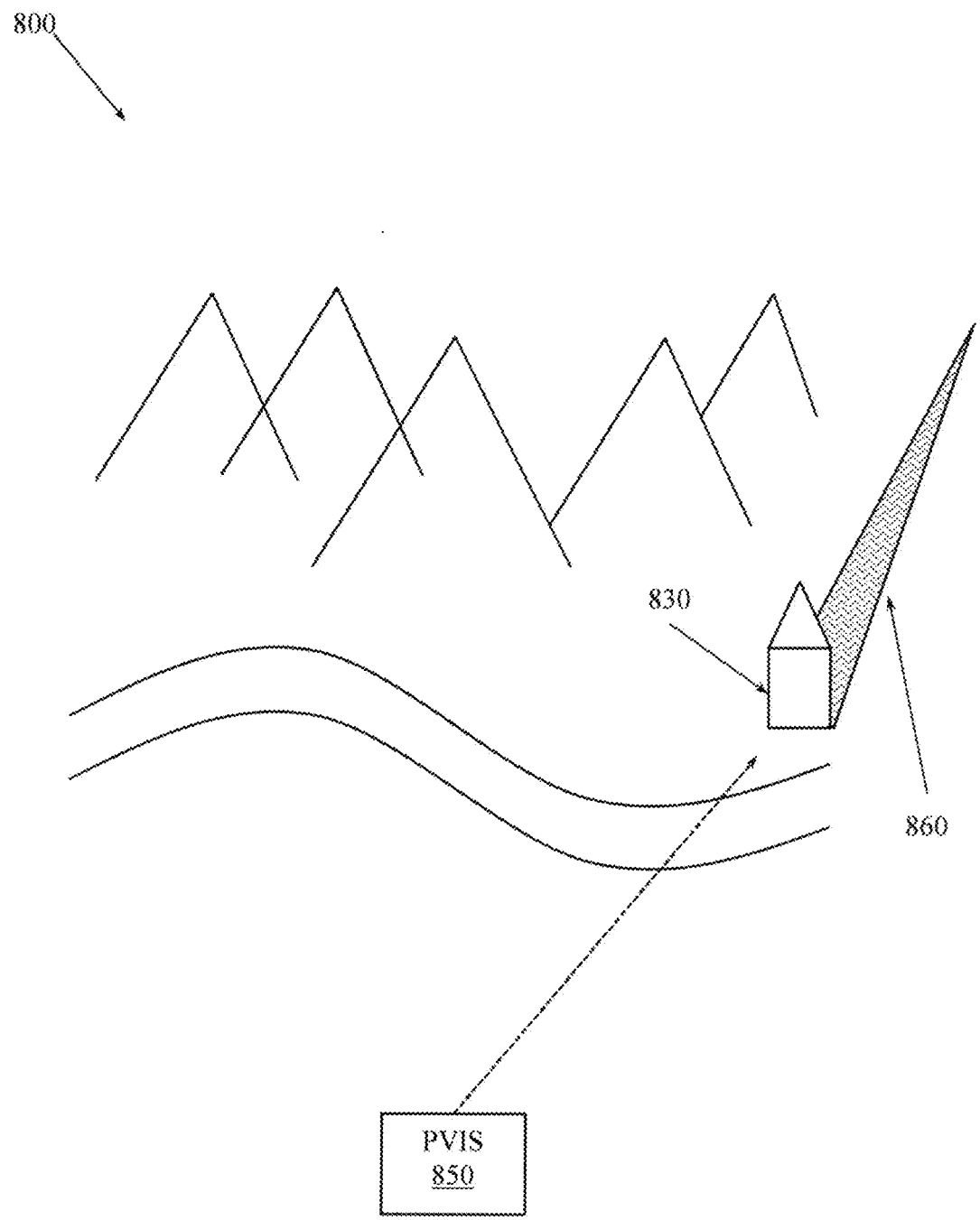
FIG. 8 illustrates a panoramic image with a blind spot area indicated.
Figure 9:
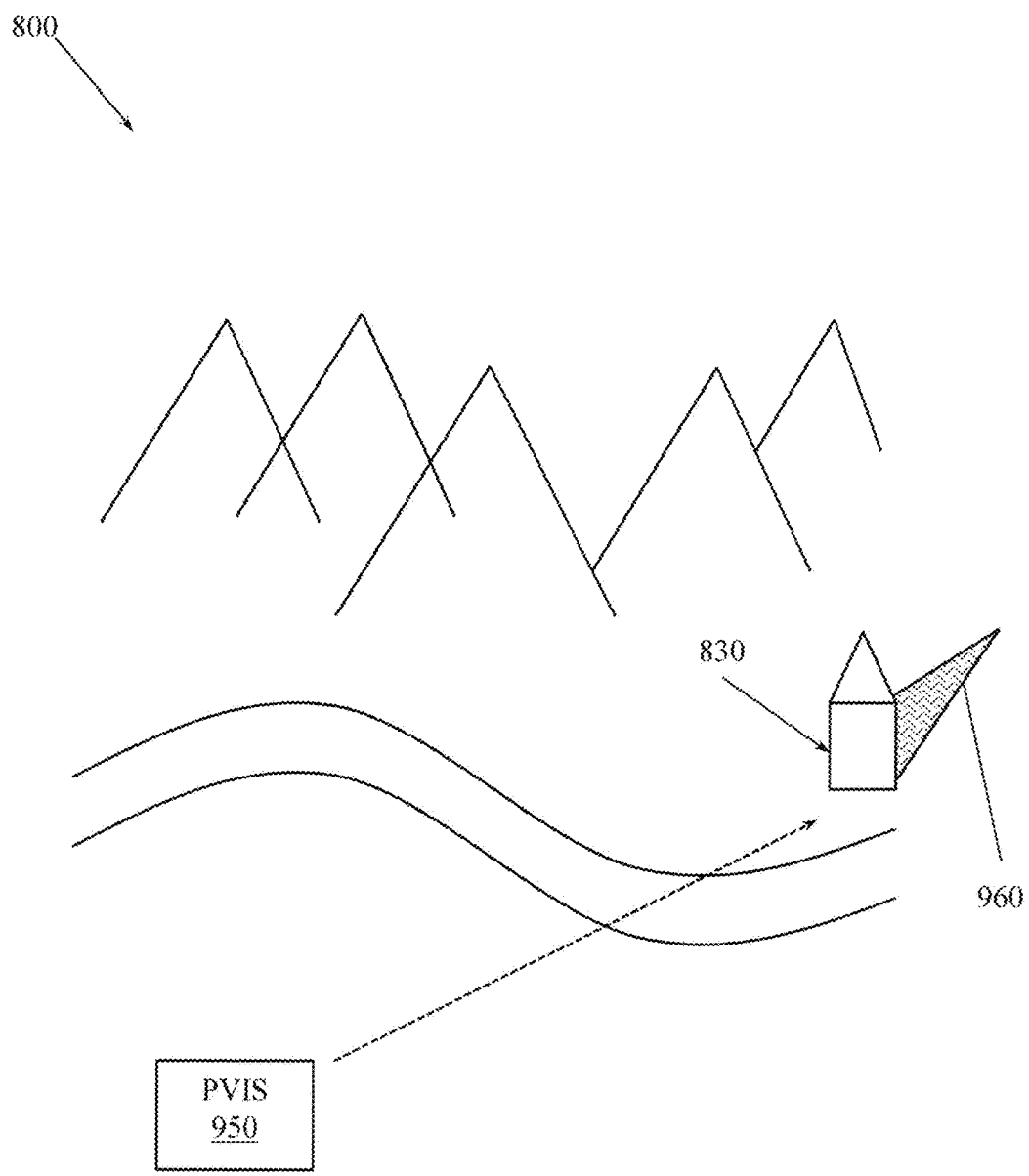
FIG. 9 illustrates a panoramic image with a blind spot area indicated.

Example systems and methods also may provide information to a user about how to reduce the area of blind spots in a scene, or the number of blind spots in the scene. System 100 may compute, based on the setup data, the range data, geo-located positions, and a determined blind spot, a different location for the system 100 that would result in less blind-spot area. System 100 may determine that moving apparatus to a second, different location, or adding another instance of system 100 to a second, different location, may reduce or eliminate blind spots in the scene. FIG. 8 illustrates scene 800 in which a PVIS 850 is placed at a first location. The first location situates PVIS 850 such that a building 830 creates a blind spot 860 of 1000 $m^2$ behind the building 830. System 100 may calculate that a second instance of system 100 located a distance to the west of the first location would substantially reduce the blind spot. FIG. 9 illustrates the same scene 800 as in FIG. 8, but with a PVIS 950 located at the second, different location, and the resultant smaller blind spot 960.

Figure 10:
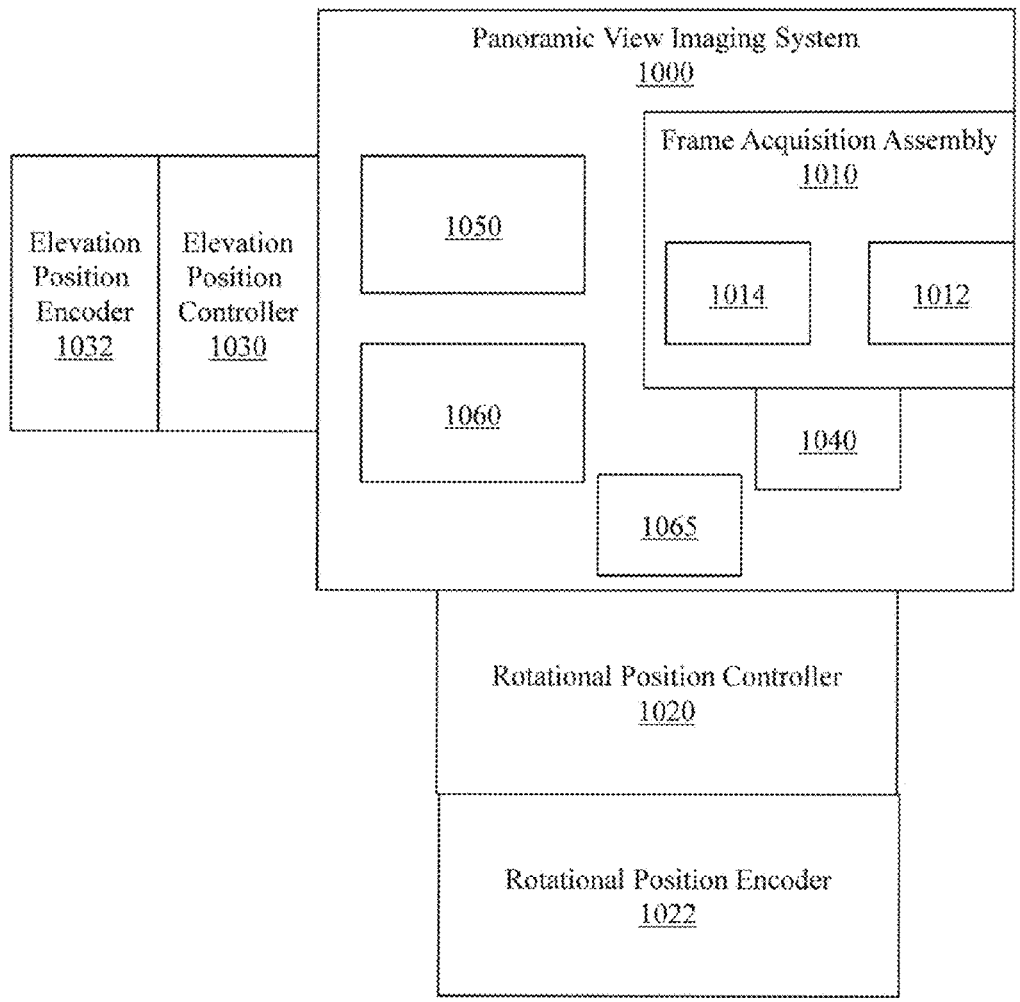
FIG. 10 illustrates an example panoramic view imaging system (PVIS).

FIG. 10 illustrates a panoramic view imaging system 1000. System 1000 includes a first frame acquisition assembly 1010 comprising a first lens 1012 and a first sensor 1014 that produce a first frame from light in a visible spectrum. In one embodiment, the first frame acquisition assembly 1010 produces frames at a rate of at least sixty images per second. Acquiring frames at such a high frame rate may facilitate detecting items (e.g., vehicles, boats) that appear in a scene, that disappear from a scene, or that move in a scene. Frames may be acquired at other rates.

The system 1000 includes a rotational position controller 1020 that pans the system 1000 or first frame acquisition assembly 1010 through a range of horizontal imaging positions and an elevation position controller 1030 that tilts the system 1000 or the first image acquisition 1010 assembly through a range of vertical imaging positions. In one embodiment, the range of horizontal imaging positions is three hundred and sixty degrees, and the range of vertical imaging positions is at least one hundred and eighty degrees. Other ranges may be employed. A rotational position encoder 1022 may store information about the rotational position of system 1000. An elevation position encoder 1032 may produce information associated with elevation position controller 1030.

The system 1000 also includes a range assembly 1065 that is associated with the first image acquisition 1010 assembly. Range assembly 1065 may include a laser range finder. Range assembly 1065 provides access to a portion of a spherical grid of range data for locations in a panoramic image produced by system 1000. Range assembly 1065 may acquire range data from points defined by the spherical grid of range data. The laser range finder may be bore-sighted with the first image acquisition 1010 assembly, or may be located a known distance from the first image acquisition 1010 assembly. For example, the laser range finder may be fixed co-axially a known distance from the first image acquisition 1010 assembly. System 1000 may pan range assembly 1065 through the same range of horizontal imaging positions and the same range of vertical imaging positions as first acquisition assembly 1010. System 1000 may pan range assembly 1065 through a larger or smaller range of horizontal imaging positions or range of vertical imaging positions.

The system 1000 also includes a zoom controller 1040 that changes the focal length of the first frame acquisition assembly 1010 by, for example, moving the lens 1012 with respect to the sensor 1014 or vice versa. The zoom controller 1040 may also change the zoom level for other frame acquisition assemblies. Zoom is just one parameter that may be manipulated during operation. Other operational parameters that can be manipulated may include, for example, horizontal position, vertical position, target grid co-ordinates, pitch, yaw, field of view, focal length, depth of field, pan rate, tilt rate, change in pan rate, or change in tilt rate.

The system 1000 also includes an image processor 1050 that produces a panoramic image from a plurality of frames produced by the first frame acquisition assembly 1010. The panoramic image has a field of view greater in both a horizontal dimension and a vertical dimension than a single frame acquired by the first frame acquisition assembly 1010. The panoramic image is produced without using a hemispherical mirror or fisheye lens. In one embodiment, the panoramic view may be enhanced with information provided by another imaging system. For example, a frame acquired by a second PVIS, by a drone, by a human carrying an imaging system, or by a targeting system may be added to the panoramic image or may replace a frame in the panoramic image. In another example, the panoramic image may be annotated with data provided by the other imaging system. The data may be from, for example, a Geiger counter, a thermometer, a barometer, a microphone, or other sensor.

Figure 11:
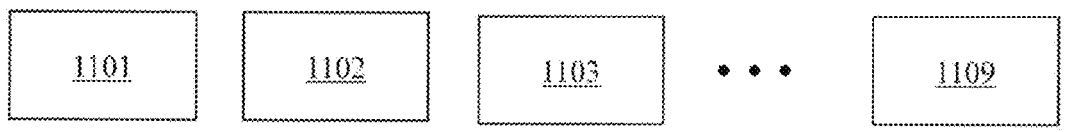
FIG. 11 illustrates a series of individual frames acquired as an example panoramic view imaging system rotates while maintaining a single tilt elevation.

FIG. 11 illustrates a series of frames that are acquired while an example system or apparatus rotates at a single elevation without tilting. Since the same elevation is maintained, frames 1101, 1102, and 1103 through 1109 may be horizontally aligned.

Figure 12:
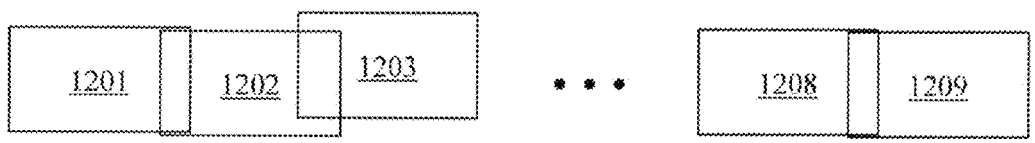
FIG. 12 illustrates a series of individual frames acquired as an example panoramic view imaging system rotates while not maintaining a single tilt elevation.

FIG. 12 illustrates a series of frames that are acquired while an example system or apparatus rotates and tilts, intentionally or otherwise. Since the same elevation is not maintained, frames 1201, 1202, and 1203 through 1208 and 1209 may not be horizontally aligned. Tilting may occur intentionally when a PVIS is controlled to move to a different elevation. Tilting may occur unintentionally when the PVIS is subjected to external forces. For example, when a PVIS is mounted on a moving wheeled vehicle (e.g., HUMVEE, truck) the wheeled vehicle may be tilted up and down as it moves over the terrain. In another example, when a PVIS is mounted in an aircraft, the aircraft may move in several axes simultaneously, which may result in tilting. Unlike conventional systems that may require a stable platform and no tilting during acquisition, example systems and methods may account for tilting or other displacements during image acquisition using pattern matching based the vertical and horizontal stitching of frames and strips of frames.

Figure 13:
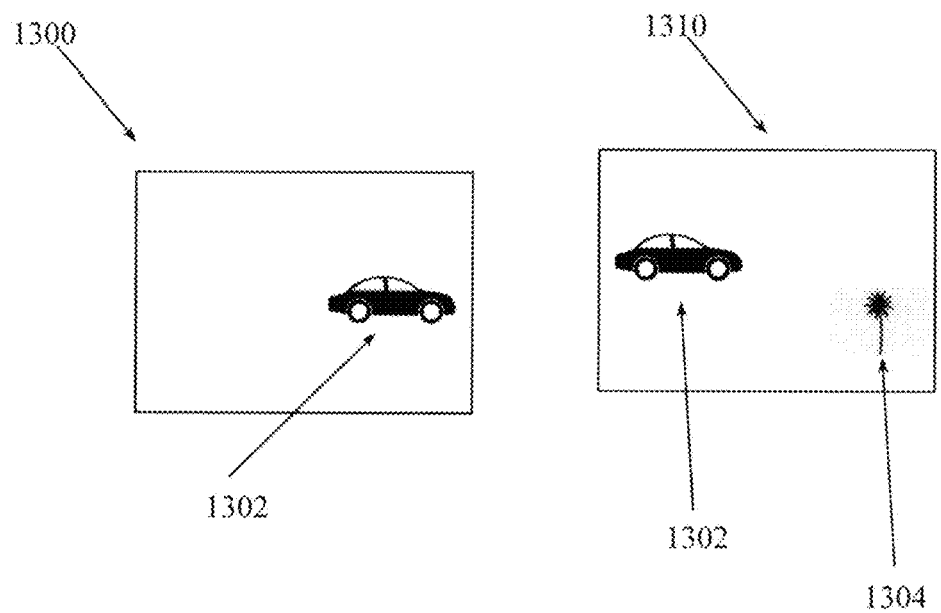
FIG. 13 illustrates two adjacent frames acquired while an example panoramic view imaging system rotates.

FIG. 13 illustrates adjacent frames 1300 and 1310. Frame 1300 includes a car 1302 and frame 1310 includes the car 1302 and a palm tree 1304. Azimuthal and elevation information associated with the frames describes the horizontal and vertical position at which the frames were acquired. Range information may be associated with the frames or elements of the frames. Stitching together or otherwise arranging a composite image from frame 1300 and 1310 may include a two-step process. First, the frames 1300 and 1310 may be positioned using the azimuthal and elevation information. Second, the frames 1300 and 1310 may be repositioned based on pattern matching that facilitates aligning frames 1300 and 1310. Example systems and methods may persist pattern matching information that is used to reposition frames. For example, edge location information, edge size information, edge orientation information, or other information may be stored in a memory or computer-readable medium in an example PVIS. In one embodiment, frames 1300 and 1310 are both acquired from the same PVIS. In another embodiment, frames 1300 and 1310 may be acquired from different apparatus. For example, frame 1300 may be acquired from a PVIS and frame 1310 may be acquired from a drone.

Figure 14:
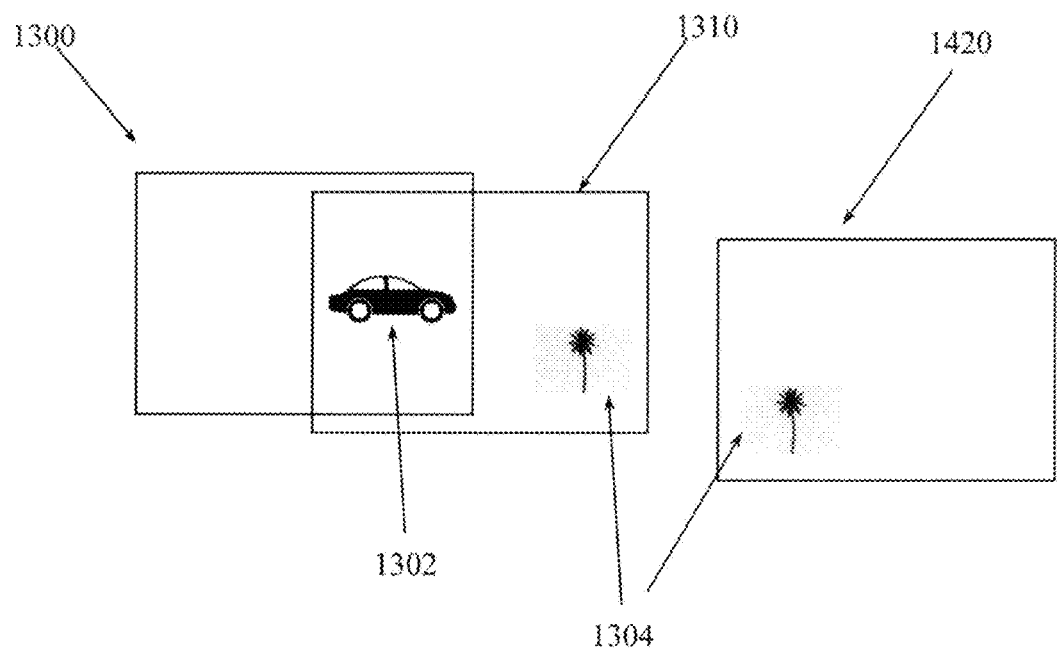
FIG. 14 illustrates adjacent frames acquired while an example panoramic view imaging system rotates and the alignment of those frames.

FIG. 14 illustrates how frame 1300 and frame 1310 have been aligned based on pattern matching of car 1302. FIG. 14 also illustrates a next frame 1420 that includes palm tree 1404. In one embodiment, frames 1300 and 1310 may be roughly positioned using the azimuthal and elevation information and then more finely positioned using pattern matching while frame 1420 is being acquired. Recall that acquiring frame 1420 involves repositioning the imaging apparatus, which may provide time for the processing involved in stitching together frames 1300 and 1310.

Figure 15:
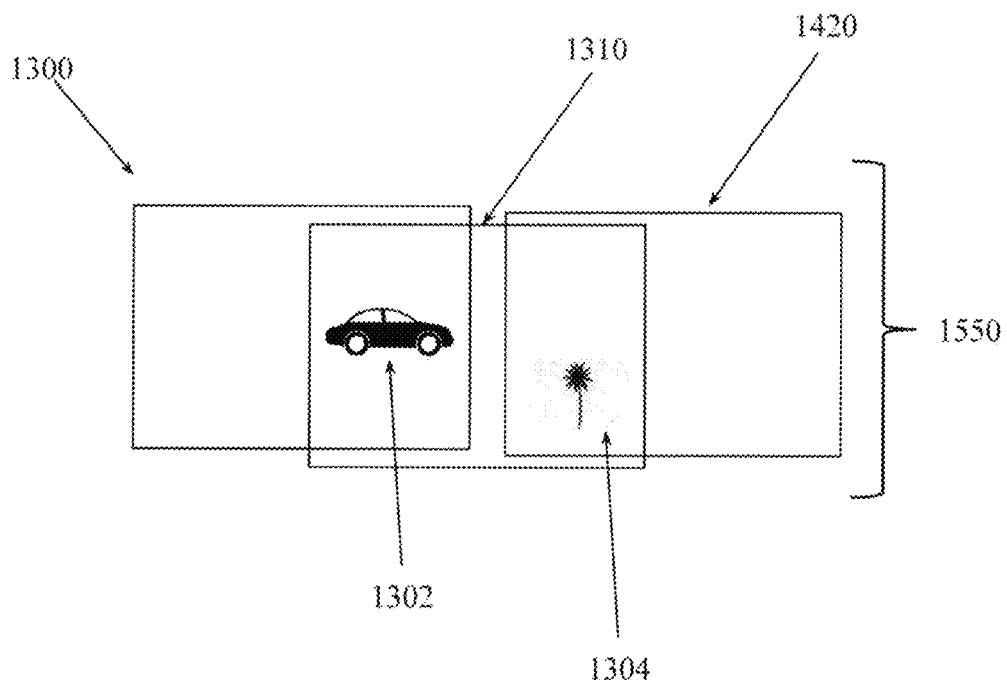
FIG. 15 illustrates the alignment of frames.

FIG. 15 illustrates frame 1420 being aligned with frame 1310 based on pattern matching of the palm tree 1304. Frames 1300, 1310, and 1420 are taking on the appearance of a strip of frames 1550. A complete strip of frames may include more than just three frames, but this smaller number is used for ease of illustration and explanation.

Figure 16:
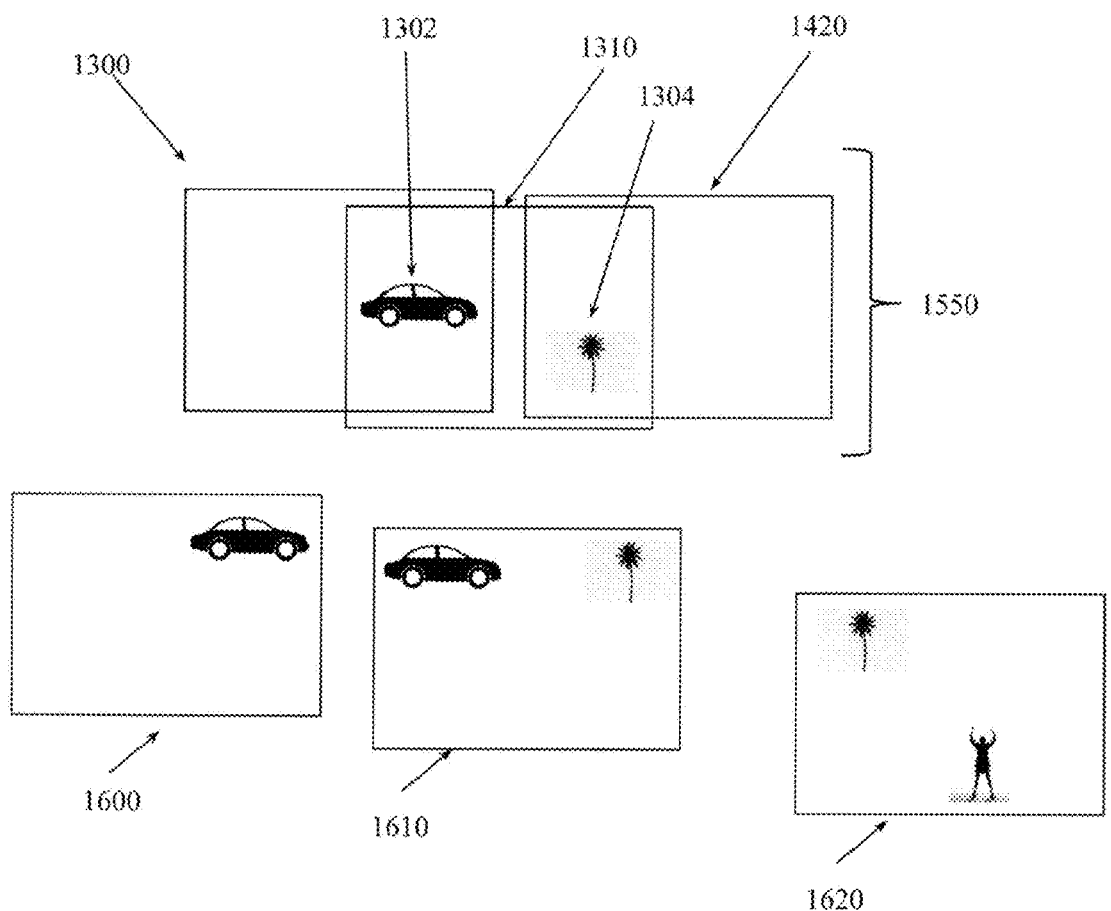
FIG. 16 illustrates the alignment of frames.

FIG. 16 illustrates additional frames 1600, 1610, and 1620 that were acquired by panning across the scene that produced frames 1300, 1310, and 1420 but at a different tilt angle. Once again, azimuthal and elevation information is available to roughly position frames 1600, 1610, and 1620 as illustrated in FIG. 16.

Figure 17:
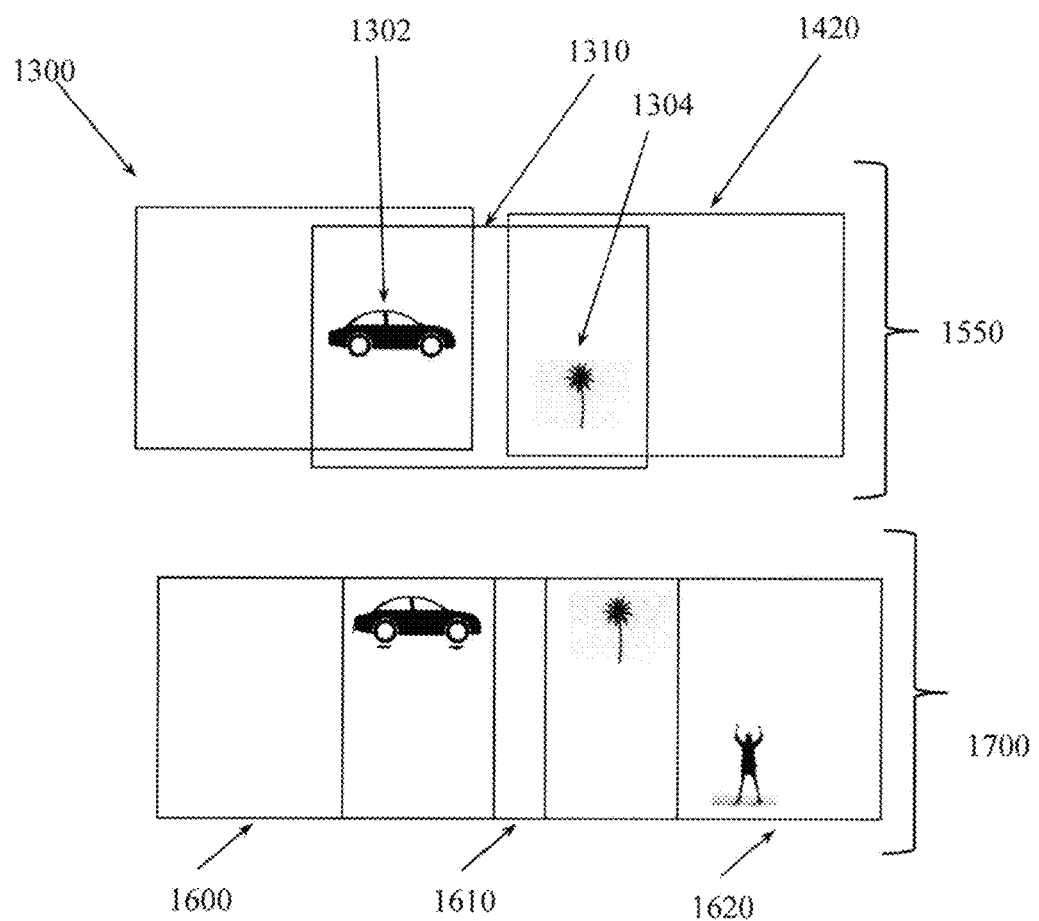
FIG. 17 illustrates the alignment of strips of frames.

FIG. 17 illustrates frames 1600, 1610, and 1620 after they have been stitched into a strip of frames 1700 using pattern matching based on common features in overlapping portions of frames 1600, 1610, and 1620.

Figure 18:
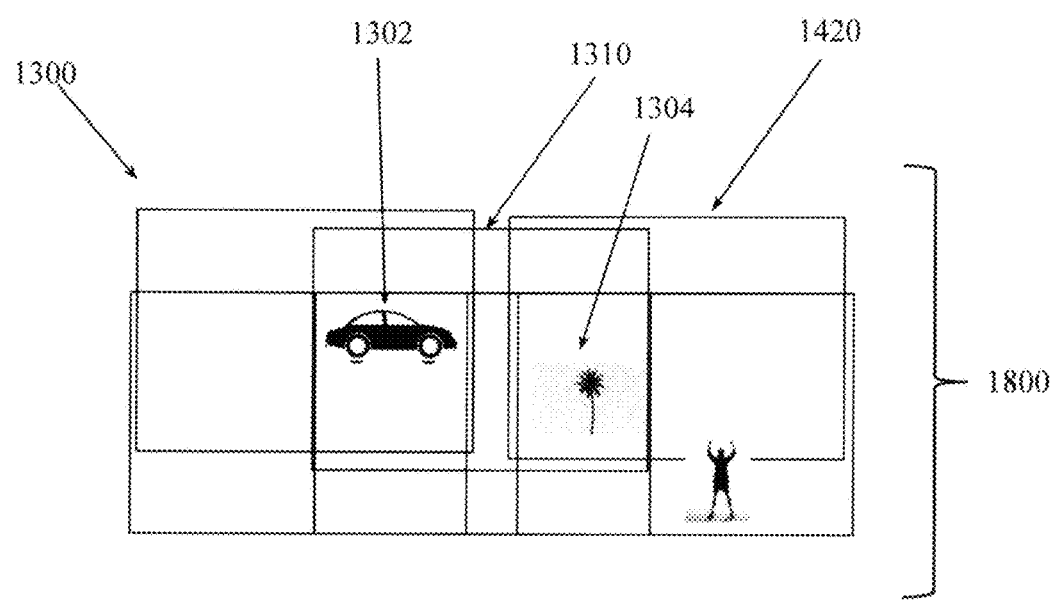
FIG. 18 illustrates the alignment of strips of frames.

FIG. 18 illustrates how strip of frames 1550 has been stitched together with strip of frames 1700 to produce a panoramic image 1800. Strip of frames 1550 and strip of frames 1700 may be roughly positioned based on azimuthal and elevation information, and may then be more finely positioned based on pattern matching of common elements in overlapping regions of the strips of frames.

Figure 19:
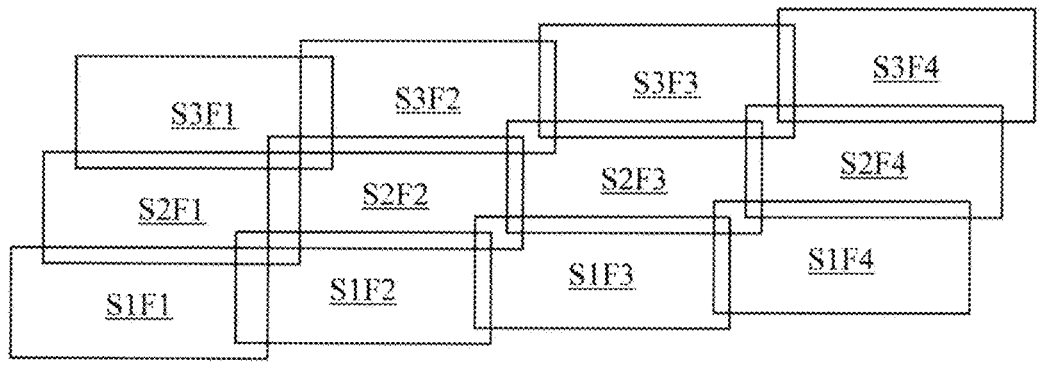
FIG. 19 illustrates frames positioned together to produce a panoramic view image.

FIG. 19 illustrates a more complex panoramic image that is stitched together from a greater number of frames. FIG. 19 illustrates a first strip of frames that includes frames S1F1, S1F2, S1F3, and S1F4. These frames may have been roughly positioned using azimuthal and elevation information and then more finely positioned using pattern matching on elements in overlapping regions. FIG. 19 also illustrates a second strip of frames that includes frames S2F1, S2F2, S2F3, and S2F4. These frames may also have been roughly positioned using azimuthal and elevation information and then more finely positioned using pattern matching on elements in overlapping regions. The first strip of frames may then have been stitched together with the second strip of frames. This stitching may have occurred while additional frames were being acquired. This stitching may also have included rough positioning based on information provided by positional encoders and finer positioning based on pattern matching. FIG. 19 illustrates a third strip of frames that includes frames S3F1, S3F2, S3F3, and S3F4. These frames may have been roughly positioned using azimuthal and elevation information and then more finely positioned using pattern matching on elements in overlapping regions. These strips of frames may then have been added to the growing panoramic image. In one embodiment, frame acquisition, frame rough alignment, frame fine alignment, strip rough alignment, and strip fine alignment may be occurring in parallel. The parallelism may be achieved using multiple processors, multiple threads, multiple processes, or combinations thereof. Range information may be associated with the frames or with elements of the frames. When the panoramic image is viewed, the range information may be retrievable by, for example, interacting with the panoramic image. For example, a portion of the panoramic image may be indicated and the range information associated with the frame in the panoramic image may be retrieved without having to perform range finding again.

To form a composite-panoramic image, frames (e.g., individual images, individual frames) are arranged together in a process called stitching. The frames that are stitched together may have range information associated with them. An initial rough arrangement of individual frames is performed using information from a position encoder or encoders on the positioner or positioners (e.g., horizontal positioner, vertical positioner) in which the image data capture apparatus resides. In one embodiment, multiple position encoders may be employed. In another embodiment, a single combined position encoder may be employed. The panoramic image may be integrated with information or imagery provided by a second PVIS or by another imaging or range finding system.

Stitching is performed using pattern matching on overlapping portions of frames. The pattern matching may involve, for example, edge matching of items visible in the frames. The edge matching may be performed in the horizontal plane, the vertical plane, or in other dimensions or combinations of dimensions. The pattern matching facilitates placing corrected, de-warped frames in the proper location for providing a seamless panoramic image from the individual frames captured at various orientations of the imaging camera(s). This positioning after correction and de-warping facilitates joining frames more precisely than in conventional systems to produce a superior composite panoramic image that does not exhibit poor scene/image edge matching and thus does not resemble a "mosaic of tiles".

Pattern matching may include identifying common features that are suitable for alignment. The locations of the common features in adjacent frames are determined and then information about the current field of view is used to position the adjacent frames. If the features overlap to within a threshold amount, then the current field of view may be correct. If there is an offset between the features, then the field of view may need to be corrected to facilitate accurate alignment. This verification may be performed for pairs of adjacent frames as an on-going verification that the FOV is correct and that images are being stitched together correctly. Or, if there is an offset between features than an item (e.g., drone, vehicle, animal, person) may have moved by an amount that caused the misalignment. Thus, in one embodiment, misalignment may trigger intruder or drone detection.

Once a pair of adjacent frames have been stitched together using pattern matching, information about the pattern matching may be maintained to facilitate a subsequent stitching of the frames. For example, the location of edges or elements, the amount of overlap required for pattern matching, or other pattern matching information may be stored. In one embodiment, changes in the edges may indicate a change in the scene which may indicate the arrival, departure, or movement of a helicopter, a drone, a cloud bank, a ship, a train, or other object.

Figure 20:
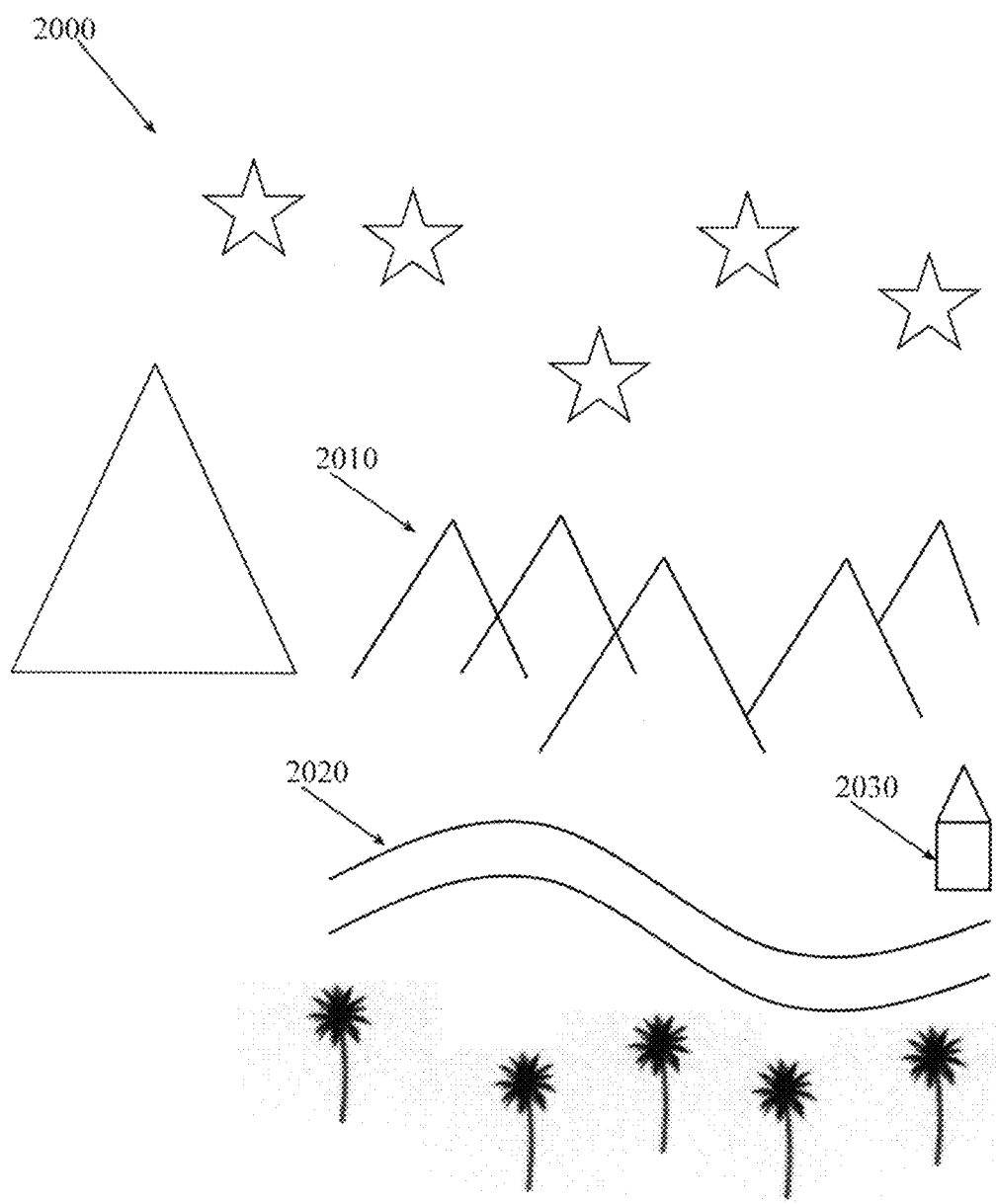
FIG. 20 illustrates an initial image of a scene to be imaged.

FIG. 20 illustrates a scene a scene 2000 that includes mountains 2010, a river 2020, and a building 2030. Scene 2000 also includes other elements including brush in the foreground and stars overhead. A user may only be interested in imaging a portion of the scene 2000. Example systems and methods facilitate identifying portions of a scene to be imaged and portions to be ignored. Example systems and methods facilitate acquiring range information for portions of the scene. The range information may be acquired and then may be available for fast recall at a later point. For example, if a person emerges from the building 2030, then a user may acquire a range to the person by touching or otherwise designating the house 2030 on the panoramic image. The previously acquired range to the building 2030 will then be retrieved without having to lase the building 2030 again.

Figure 21:
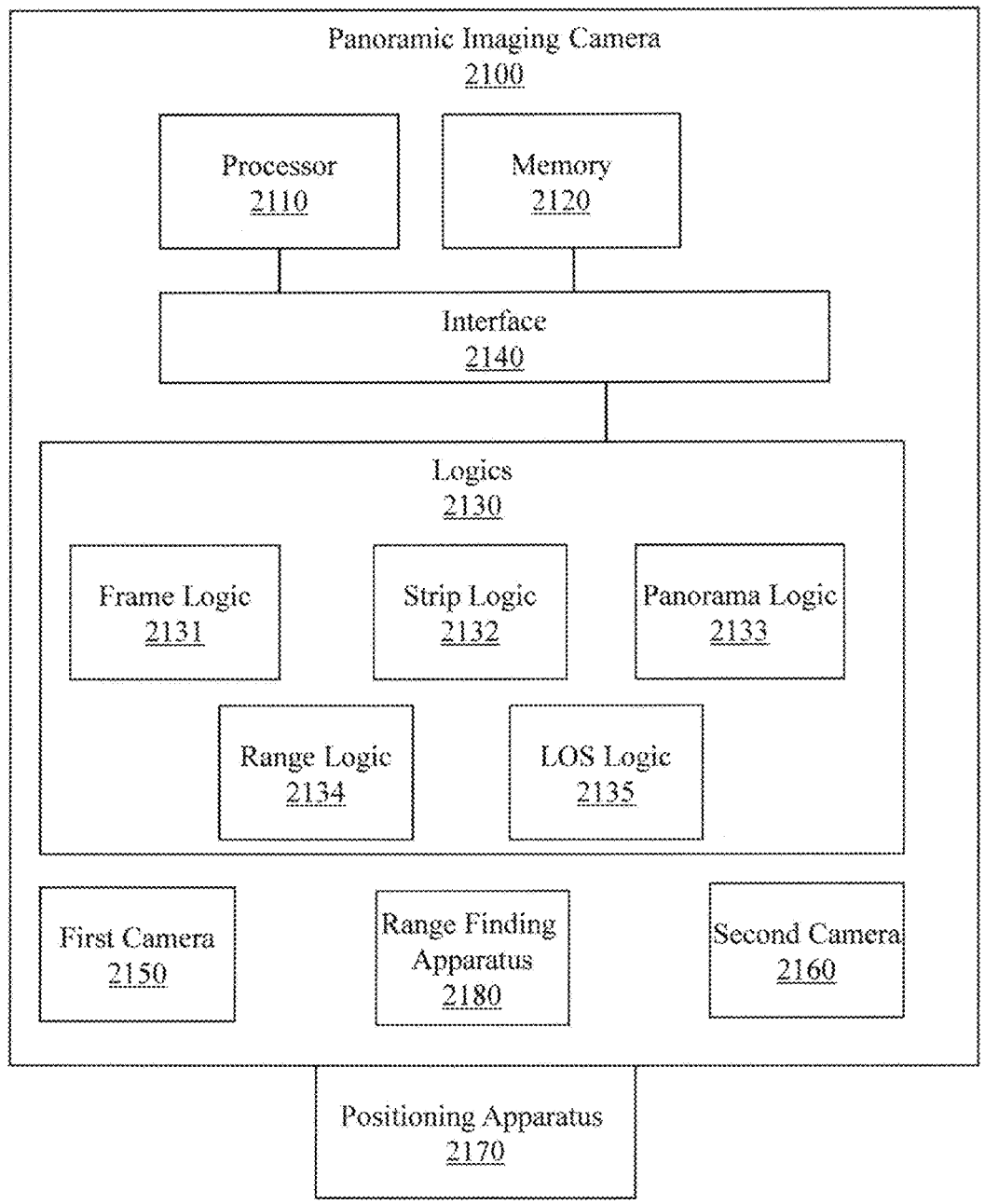
FIG. 21 illustrates a panoramic imaging camera that produces a panoramic view image.

FIG. 21 illustrates a panoramic imaging camera 2100 that performs panoramic view imaging. Camera 2100 includes a processor 2110, a memory 2120, a first camera 2150 comprising a lens and sensor, a second camera 2160 comprising a lens and sensor, a positioning apparatus 2170, and a set 2130 of logics that is connected to the processor 2110 and memory 2120 by a computer hardware interface 2140. In one embodiment, processor 2110 and the set of logics 2130 may operate under varying conditions that produce superior results to conventional systems.

The first camera 2150 may produce frames from electromagnetic radiation in a first spectrum (e.g., visible light) while the second camera 2160 may produce frames from electromagnetic radiation in a second spectrum (e.g., IR, UV). Electromagnetic radiation acquired in the first spectrum or the second spectrum is acquired passively. A frame includes a pixel.

Camera 2100 includes a positioning apparatus 2170 that pans or tilts the camera 2100 and that provides data about the pan or tilt orientation of the camera 2100 at which a frame was acquired. Camera 2100 stores data about the pan or tilt orientation of camera 2100.

Camera 2100 includes a range finding apparatus 2180 that provides range information for locations identified by the positioning apparatus 2170. Range apparatus 2180 may be mounted co-axially with the first camera 2150 or the second camera 2160. Positioning apparatus 2170 also provides data about the pan and tilt orientation associated with the range apparatus 2180.

In one embodiment, camera 2100 may produce images from data acquired from more than one sensor. In this embodiment, camera 2100 combines an image from one spectrum acquired by first camera 2150 with an image from another spectrum. The image from the other spectrum may be acquired from the second camera 2160. The combining may be performed at the image level, the strip of frames level, or the frame level. The combining may be performed by a member of the set of logics 2130.

In one embodiment, the functionality associated with the set of logics 2130 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 2130 are implemented as ASICs or SOCs. In one embodiment, the frame logic 2131, the strip logic 2132, the panorama logic 2133, the range logic 2134, or the LOS logic 2135 may be ASICs, FPGA, or other integrated circuits.

The set 2130 of logics includes a frame logic 2131 that produces individual frames from electromagnetic radiation acquired by the first camera 2150 or the second camera 2160. Different individual frames may be acquired with different operating parameters. The operating parameters may include, for example, horizontal position, vertical position, target grid co-ordinates, pitch, yaw, field of view, focal length, depth of field, light intensity, angle of light, temperature, humidity, atmospheric pressure, pan rate, tilt rate, change in pan rate, or change in tilt rate. Operating parameters may be defined by a factory default, by a user when camera 2100 is set up, or automatically. Operating parameters may be changed by a user, or may be changed automatically. In one embodiment, frame logic 2130 de-warps an individual frame before providing the individual frame to the strip logic 2132.

The camera 2100 also includes a strip logic 2132 that produces a strip of frames. The strip of frames may be pieced together from a plurality of individual frames produced by the frame logic 2131. In one embodiment, the strip logic 2132 produces the strip of frames by positioning individual frames produced by the frame logic 2131 in the strip of frames based on a pan and tilt orientation associated with the individual frame as provided by the positioning apparatus 2170, and then selectively repositioning individual frames in the strip of frames based on edge detection pattern matching in regions where adjacent frames in the strip of frames overlap. In one embodiment, information about the edge detection pattern matching may be persisted to facilitate detecting changes in frames subsequently acquired with the same pan and tilt orientation. The persisted information may also be used to increase the efficiency of subsequent rough positioning and repositioning of frames acquired with the same pan and tilt orientation or with the same drone position and orientation information. Persisting the information may include storing the information in a memory in camera 2100 or on a computer-readable medium available to camera 2100. The information that is persisted may include, for example, a number of edges, a location of an edge, an edge orientation, or other information.

The camera 2100 also includes a panorama logic 2133 that produces a panoramic image. The panoramic image is pieced together from two or more strips of frames processed by strip logic 2132. In one embodiment, the panorama logic 2133 produces the panoramic image by positioning individual strips of frames produced by the strip logic 2132 in the panoramic image based on a pan and tilt orientation associated with individual frames in the strips of frames as provided by the positioning apparatus 2170, and then selectively repositioning individual strips of frames in the panoramic image based on edge detection pattern matching in regions where adjacent frames in the strips of frames overlap. In one embodiment, information about the edge detection pattern matching may be persisted to facilitate detecting changes in strips of frames subsequently acquired with the same pan and tilt orientation. The persisted information may also be used to increase the efficiency of subsequent rough positioning and repositioning of strips of frames acquired with the same pan and tilt orientation.

In one embodiment, panorama logic 2133 adds, to the panoramic image, detail information about a portion of the scene depicted in the panoramic image. The detail information may be based on the range information. In one embodiment, panorama logic 2133 changes the panoramic image to include information based on imagery data acquired from a different panoramic imaging camera, or from other sources. Panorama logic 2133 may also change the panoramic image by removing an object that occludes a blind spot, and by adding imagery of the blind spot. For example, panorama logic 2133 may receive imagery from an imaging device attached to a helicopter, a drone, a truck, or other vehicle that has an unobstructed LOS to a blind spot, and, upon removing the object that occludes the blind spot from the panoramic image, add the imagery acquired from the other imaging device to the panoramic image.

The camera 2100 also includes a range logic 2134 that determines range information for locations in the scene represented by the panoramic view image. Range logic 2134 acquires range data for a point in an individual frame using the range finding apparatus 2180. Range finding apparatus 2180 is positioned according to a pan and tilt orientation associated with the first camera 2150 or the second camera 2160 when the frame was acquired. Range logic 2134 associates the range data with a pixel in the individual frame. Upon associating some or all of the available range data with pixels in the individual frame, range logic 2134 determines if a pixel in the individual frame has associated range data. Upon determining that a pixel in the individual frame does not have associated range data, range logic 2134 generates range data for the pixel by estimating range data for the pixel. Range logic 2134 may linearly interpolate range data for the pixel based on range data for other, different pixels in the individual frame. FIG. 3 illustrates a linear interpolation technique. In another embodiment, other estimation or interpolation techniques may be employed.

Range logic 2134 also generates an improved panoramic image. The improved panoramic image has access to range data associated with a pixel in the individual frame. Range logic 2134 may display the improved panoramic image. Range logic 2134 may display the improved panoramic image through a GUI that is part of a laptop computer, a desktop computer, a smartphone, a multifunction display, or other type of display. A user may control the GUI to display range data by selecting a location in the panoramic image, either graphically, or numerically by entering a set of coordinates associated with a location in the panoramic image.

In one embodiment, range data associated with the improved panoramic image is stored in a data structure separate from the improved panoramic image. The range data associated with the improved panoramic image may also be embedded in the improved panoramic image. The range logic 2134 may access the range data in the data structure or embedded in the improved panoramic image without controlling the range logic 2134 to re-acquire data.

The camera 2100 also includes an LOS logic 2135 that produces LOS information based, at least in part, on the range information. LOS logic 2135 determines LOS information for locations in the scene represented by the panoramic view image. LOS logic 2135 accesses a map associated with the scene represented in the panoramic image. The map may include geo-location information, including map co-ordinates, GPS co-ordinates, latitude and longitude information, or other geo-location information. LOS logic 2135 converts the range data to a geo-location on the map. LOS logic 2135 computes a blind spot, where a blind spot is a location on the map for which the range logic 2134 has not acquired range data. LOS logic 2135 may compute a blind spot after all range data available to LOS logic 2135 has been converted, or LOS logic 2135 may compute a blind spot in parallel with the conversion of range data. LOS logic 2135 generates an improved map. The improved map indicates the blind spot.

FIG. 6 illustrates an overhead view of a topographic map upon which a blind spot 610 has been highlighted. LOS logic 2135 may also generate an updated improved panoramic image. The updated improved panoramic image indicates the blind spot. FIG. 7 illustrates blind spots indicated by arrows 710 and arrows 720. LOS logic 2135 also may display, on a GUI, the improved map or the updated improved panoramic image.

In one embodiment, LOS logic 2135 may compute a second location for camera 2100. LOS logic 2135 may then determine another, second, blind spot based on the second location. LOS logic may also compute the area of a first blind spot, the area of the second blind spot, and display, on the improved map or the updated improved panoramic image, information about the second blind spot and the second location.

In one embodiment, camera 2100 may produce images from data acquired from more than one sensor. In this embodiment, camera 2100 combines an image from one spectrum with an image from another spectrum. The image from the other spectrum may be acquired from a second lens associated with the camera 2100 or a second sensor associated with the lens and the camera 2100. The combining may be performed at the image level, the strip of frames level, or the frame level.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 22:
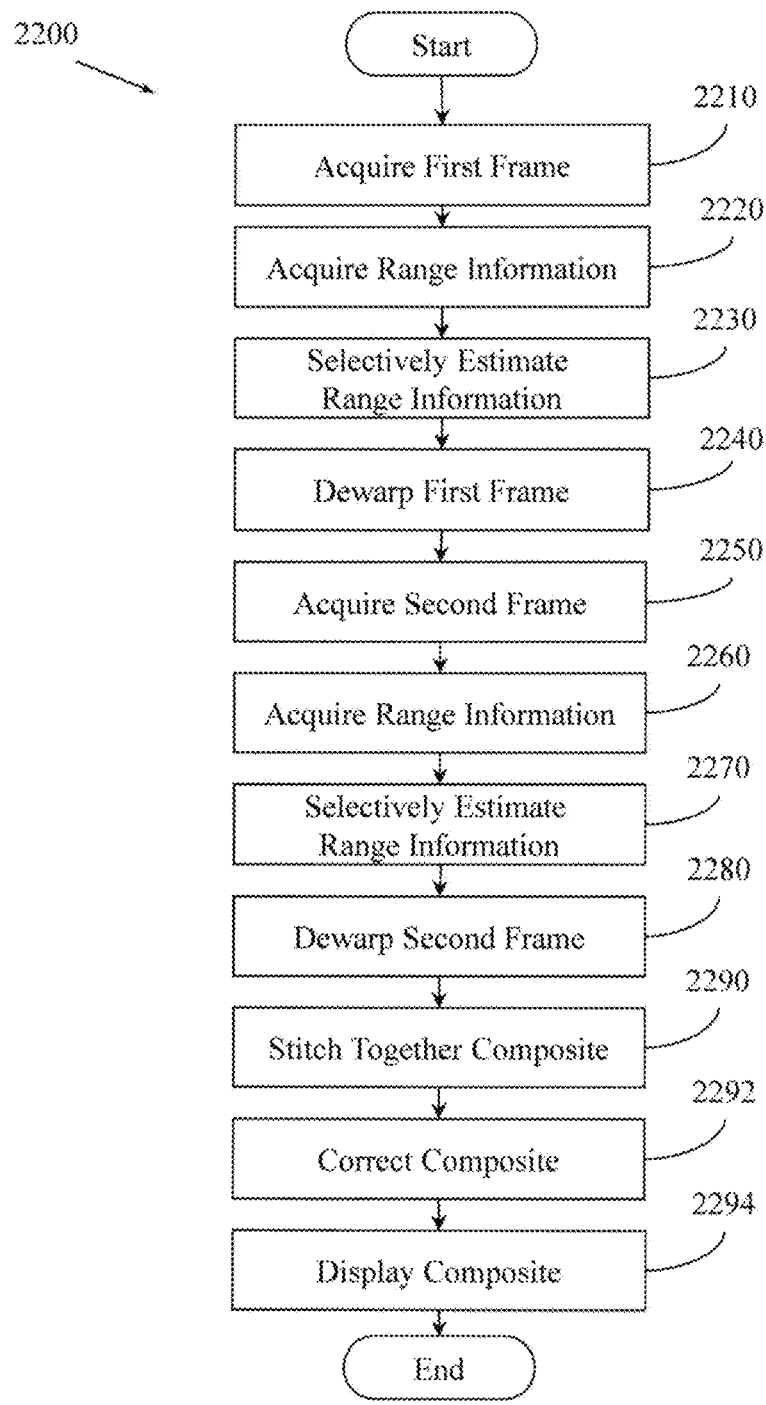
FIG. 22 illustrates a method for producing a panoramic view image with range information.

FIG. 22 illustrates an example computerized method 2200 associated with a PVIS. Method 2200 can only be performed in a computer or circuit because electronic voltages or other computer signals need to be generated to produce the panoramic view image. These electronic voltages or other computer signals cannot be generated by pen and paper or in the human mind.

Method 2200 includes, at 2210, acquiring a first frame from a PVIS. The first frame is acquired at a first pan and tilt orientation. Method 2200 proceeds, at 2220, to acquire range information. The range information is acquired at the first pan and tilt orientation. Method 2200 may acquire range information for one or more locations in the first frame. The range information may be acquired by a laser range finder that is co-axially attached to the PVIS, or the range information may be acquired by another type of range finder. Method 2200 proceeds, at 2230, to selectively estimate range information for one or more locations in the first frame. Method 2200 may estimate range information for positions or pixels within the first frame that have not had range information acquired for them. Method 2200 may estimate range information using interpolation, using a flat-earth model, by using user-supplied elevation data, or by other range-estimation techniques. Method 2200 proceeds, at 2240, to de-warp the first frame.

Method 2200 then proceeds, at 2250, to acquire a second frame from the PVIS. The second frame is acquired at a second pan and tilt orientation. Method 2200 then proceeds, at 2260, to acquire range information for the second frame. The range information for the second frame is acquired at the second pan and tilt orientation. Method 2200 then proceeds, at 2270, to estimate range information for positions or pixels within the second frame. Method 2200 then proceeds, at 2280 to de-warp the second frame. In one embodiment, the first frame and second frame may be de-warped in parallel.

Method 2200 then proceeds, at 2290, by stitching together a composite image from the first frame and the second frame. The composite image will have a greater field of view than either the first frame or the second frame. In one embodiment, stitching together the composite image includes positioning the first frame and the second frame with respect to each other based on the first pan and tilt orientation and the second pan and tilt orientation. Stitching together the composite image then includes repositioning the first frame and the second frame with respect to each other based on pattern matching in a region where the first frame and the second frame overlap. The overlap may be determined by a number or type of items in the image. The pattern matching may be aided by the range information. For example, candidate objects for pattern matching may be selected based, at least in part, on the range to the item. In one embodiment, closer items may be preferred over items that are farther away. In one embodiment, the composite image includes range information for a plurality of locations or pixels in the composite image. Range information may be have been acquired and stored for a first set of points for the first frame and for a second set of points for the second frame. There may be some overlap between the first set of points and the second set of points and thus less data may need to be stored for the stitched together composite of the two frames than was necessary for each individual frame. This may reduce memory requirements and thus improve the efficiency of an apparatus.

Method 2200 then proceeds, at 2292, by correcting the composite image and, at 2294, by displaying the composite image. Displaying the composite image may include displaying range information associated with positions or pixels within the frames from which the composite image was stitched.

In one embodiment of method 2200, stitching together the composite image includes positioning the first frame and the second frame with respect to each other based on the first pan and tilt orientation and the second pan and tilt orientation. Stitching together the composite image also includes repositioning the first frame and the second frame with respect to each other based on pattern matching in a region where the first frame and the second frame overlap.

In one embodiment of method 2200, selectively estimating range information for one or more additional locations in the first frame or one or more additional locations in the second frame includes estimating range information. Method 2200 may estimate range information using a flat-earth model. Method 2200 may estimate range information using user-supplied elevation data, or GPS data. Method 2200 may also estimate range information using interpolation. The interpolation may be based on range information associated with one or more locations in the first frame or one or more locations in the second frame. In one embodiment, method 2200 may estimate range information using linear interpolation, polynomial interpolation, spline interpolation, nearest neighbor interpolation, trigonometric interpolation, multivariate interpolation, or a Gaussian process.

In one embodiment, method 2200 further comprises accessing the range information associated with the plurality of locations. Method 2200 may access the range information from a data structure or from the composite image without controlling the laser range finder to re-acquire range information. Accessing range information without controlling the laser range finder to re-acquire range information improves on conventional approaches by facilitating accessing range information in a faster, more tactically relevant time-frame. Accessing range information without controlling the laser range finder also facilitates accessing range information when the laser range finder may be non-functional, or may be inoperable due to environmental conditions, or countermeasures. Thus, a user may have access to range information even in the face of inhospitable conditions or countermeasures. Accessing range information without having to lase an item also facilitates retaining stealthy properties of an apparatus.

In one embodiment, method 2200 further comprises generating a set of waypoints. The set of waypoints may be based on range information for one or more locations in a plurality of frames. Method 2200 controls the PVIS to follow the set of waypoints in an imaging path. A waypoint has a pan and tilt orientation. A range associated with a waypoint is within a threshold range. A waypoint may be within a pan range or a tilt range. Method 2200 may then control the PVIS to acquire a third frame from a waypoint in the set of waypoints. Method 2220 proceeds by controlling the range finder to acquire range information from one or more locations in the third frame. Method 2200 proceeds by selectively estimating range information for a location in the third frame, and by updating the composite image or the data structure based, at least in part, on the third frame. For example, a user may wish to control the PVIS to scan a ridge line approximately 1 km away from the PVIS, where the ridge line covers approximately 45 degrees in azimuth of horizon. In this example, method 2200 may control the PVIS to generate a set of waypoints based on a tilt range of +5 degrees to −5 degrees, a pan range of 50 degrees, and a threshold range of 1000 m plus or minus 100 m. The set of waypoints may be based on other parameters.

Figure 23:
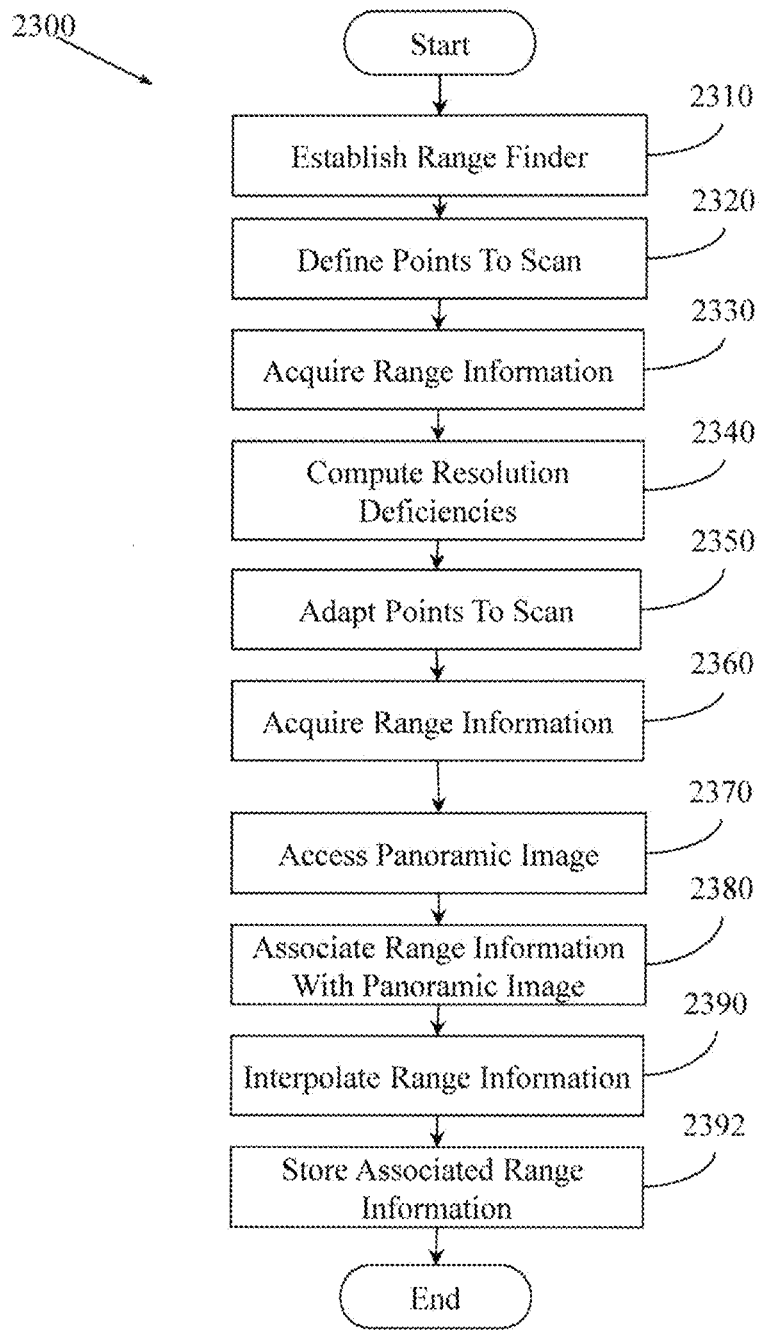
FIG. 23 illustrates a method for adaptively acquiring range information.

FIG. 23 illustrates an example computerized method 2300 for analyzing blind spots based on LOS determined from range values associated with a scene. The scene may be captured by a PVIS as described in method 2200. Method 2300 may be implemented by an apparatus that is also implementing method 2200. Method 2300 includes, at 2310, establishing a range finder at a location. The location has an absolute location or a relative location. An absolute location may include latitude and longitude, map co-ordinates, GPS co-ordinates, or other co-ordinates. A relative location may be defined on the range finder. Establishing the range finder may include setting up operating parameters for the range finder. Operating parameters for the range finder may include an azimuth limit, an elevation limit, initial grid resolution, or a minimum grid resolution. Operating parameters for the range finder may also include a latitude, a longitude, an elevation above ground level, and an elevation above sea level. In one embodiment, the operating parameters for the range finder are the same operating parameters used by a PVIS described above. Operating parameters for the range finder may be designated by a user, may be set to default settings at a factory, or may be automatically set. Operating parameters may be acquired from an onboard GPS system. If absolute location information is not available, method 2300 may use the range finder as a reference point, and define relative location information based on the position of the range finder. A user may enter operating parameters or edit operating parameters vocally, graphically via a GUI, or operating parameters may be entered numerically. In one embodiment, a user may graphically enter operating parameters on a static panoramic image. For example, a user may select an area on the panoramic image to define an azimuth limit and an elevation limit. In one embodiment, a user may define, or a PVIS may automatically determine, a surface-sky interface.

Method 2300 also includes, at 2320, defining a set of points to scan with the range finder. The set of points to scan may be defined by an azimuth range, an azimuth resolution, an elevation range, and an elevation resolution. The azimuth range, the azimuth resolution, the elevation range, and the elevation resolution may be set at step 2310 when the operating parameters for the range finder are set. The azimuth range, the azimuth resolution, the elevation range, and the elevation resolution may be oriented on the location. The set of points to scan may default to an azimuth range of 360 degrees and an elevation range of 180 degrees.

Method 2300 also includes, at 2330, acquiring range information for a first point in the set of points. The range information is acquired for at least a first azimuth and a first elevation. Method 2300 further includes, at 2330, acquiring range information for a second point in the set of points at a second azimuth and a second elevation. Acquiring range information may include controlling the range finder to target a first azimuth and a first elevation, and controlling the range finder to acquire range information at a first azimuth and a first elevation.

Method 2300 also includes, at 2340, computing resolution differences between points. Method 2300 may compute range differences between points, or angular differences between points. Computing resolution differences includes computing the difference between a range associated with the first point in the set of points, and a range associated with the second point in the set of points.

Method 2300 also includes, at 2350, adapting the set of points to scan. Method 2300 adaptively adjusts the set of points to scan based, at least in part, on the computed resolution differences. In one embodiment, upon determining that the difference between the range associated with the first point and the range associated with the second point is greater than a range threshold, method 2300 computes an azimuth and an elevation for a third point that bisects the angle described by the first point, the location, and the second point. The third point may bisect the first point and the second point in both azimuth and elevation. The third point may bisect the angle described by the first point, the location, and the second point into two equal parts, or into two unequal parts. The range threshold may be a measure of distance, including 10 m, 100 m, or another, different distance, or may be in another measurement system. The range threshold may be user defined, or may be adapted by a user.

Method 2300 may also, at 2350, adapt points to scan. Adapting points to scan may include determining that an angular difference between the third point and the first point or the second point is greater than an angular resolution threshold. Upon determining that the angular difference between the third point and the first point or the second point is greater than an angular resolution threshold, method 2300 selects a point from among the first point and the second point that has the lower angular difference from the third point. For example, if the first point is 0.5 degrees from the third point, while the second point is 0.2 degrees away, and the angular resolution threshold is 0.1 degrees, method 2300 may select the second point from which to acquire range information. If the angular difference between the third point and the first point and second point is within the angular resolution threshold, method 2300 controls the range finder to acquire range information from the third point. Method 2300 proceeds, at 2360, by acquiring range information from the set of adjusted points. Thus, method 2300 may acquire range information from a point that bisects two points that exceed the range threshold, or method 2300 may acquire range information from a point that is angularly closer to the bisecting third point. By adapting the points to scan, example methods and systems reduce the chance that anomalous range information will be overlooked or accepted as reliable.

Method 2300 also includes, at 2370, accessing a panoramic image of a scene associated with the range finder. The panoramic image is an image acquired over at least a subset of the set of points. The panoramic image includes a set of frames, where a frame is acquired at a point in the set of points. A frame includes a pixel. Accessing the panoramic image may include accessing a panoramic image acquired by a PVIS of which the range finder is a part, accessing a panoramic image supplied by a different PVIS, or accessing a panoramic image supplied by a user.

Method 2300 also includes, at 2380, associating range information with the panoramic image. Associating range information with the panoramic image includes generating an associated range data by relating a range data for a point in the set of points with a position in the panoramic image. The range data and the position in the panoramic image were acquired at the same azimuth and elevation.

Method 2300 also includes, at 2390, selectively interpolating range information for a point in the panoramic image. Method 2300 may determine that a first position in the panoramic image does not have associated range data. For example, the range finder may have acquired range information for four points in the image, as illustrated by points 320, 330, 340, and 350 in FIG. 3, but method 2300 may determine that the range finder has not acquired information for point 310. Method 2300 may interpolate a range for point 310. In one embodiment, method 2300 uses linear interpolation to interpolate a range for a first position in the panoramic image that does not have an associated range data. In another embodiment, other forms of interpolation, including polynomial interpolation, multivariate interpolation, trigonometric interpolation, or a Gaussian process, may be employed. In another embodiment, method 2300 may acquire range data acquired by a different range finder and compute range data for the first position in the panoramic image that does not have associated range data based on the range data acquired by the different range finder.

Method 2300 also includes, at 2392, storing the associated range information. The associated range information may be stored in a memory, in a data structure, in a data storage device on board a PVIS, or in a data storage device physically separate from the range finder but that the range finder can access. The data structure may include a lookup table, an array, a list, a vector, or other data structure. For example, a PVIS located in an insecure location (e.g., combat zone) may be configured to not store associated range data locally, but to encrypt and transmit the associated range data to a storage device in a safer location. Storing the associated range data improves the speed with which a user can access range information associated with the panoramic image without having to re-acquire range data.

Method 2300 may periodically update the associated range data with updated range data. In one embodiment, a user may control the range finder to acquire updated range data over the initial set of points to scan, or over a different set of points to scan. In another embodiment, method 2300 may control the range finder to acquire range information for a set of points defined by a set of user-defined waypoints within the scene, or by a set of automatically defined waypoints.

Figure 24:
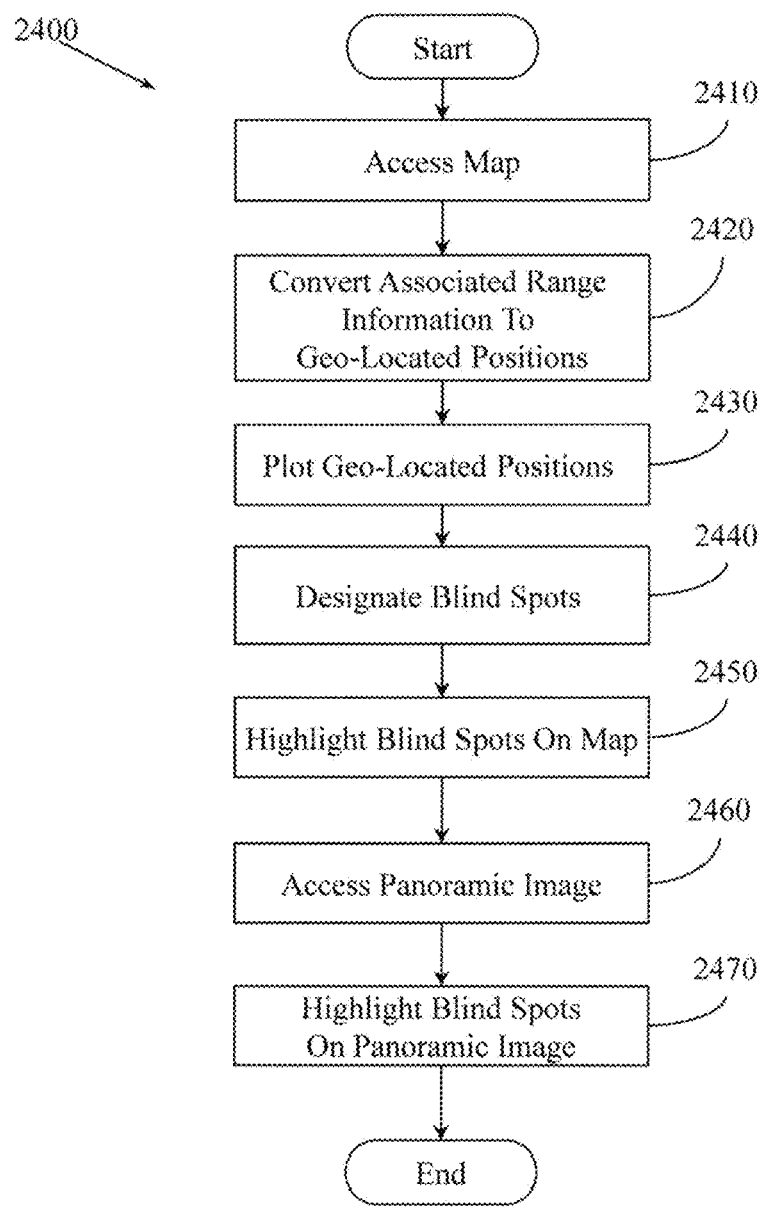
FIG. 24 illustrates a method for determining blind spots in a panoramic image.

FIG. 24 illustrates an example computerized method 2400 associated with a PVIS for determining blind spots in a scene. Method 2400 may be performed by an apparatus that is performing method 2300, or may be performed independently. Method 2400 includes, at 2410, accessing a map. Accessing a map may include accessing a map acquired from a GPS system, a topographical map, a top-down satellite image, or other type of map. The map has a geo-located position. The map's geo-located position may be defined using a co-ordinate system with the absolute location of the PVIS. If the absolute location of the PVIS is not available, geo-locations in the map may be defined relatively with the location of the PVIS.

Method 2400 also includes, at 2420, converting associated range information to a geo-located position. Range information may be converted to geo-located positions using a right-triangle calculation based on the height of the range finder, the range data, and the look-down angle described by the range data and a vertical line dropped to the ground from the height of the range finder. The tilt position of the PVIS or range finder for a particular point describes the look-down angle. The lateral range from the PVIS to an object ranged by the range finder, and the object's elevation may be calculated from the results of the right-triangle calculation. If the PVIS's GPS location and elevation above sea level is known, and an absolute reference to north is available, method 2400 may compute the actual latitude and longitude of a geo-located position. The associated range data may be associated range data produced by method 2300 that has been stored. Method 2400 may compute a relative geo-location centered on the PVIS.

Method 2400 also includes, at 2430, plotting the geo-located position converted from the associated range information to the map. A geo-located position may be described as a data point. The size of a data point may be used to represent the spatial resolution of the data point. A geo-located position may be plotted on a two-dimensional map, on a side view image of the scene, on a virtual wire-frame model, on a 3D image of the scene, on a panoramic image, or on a plot.

Method 2400 also includes, at 2440, designating blind spots on the map. Method 2400 determines which locations on the map do not have associated range data. A location on the map that does not have associated range data is a location on the map for which the range finder was not able to acquire range data. Method 2400 designates a location on the map that does not have associated range data as a blind spot. For example, a location in the scene being imaged may be occluded by a house. Occluded locations on the map behind the house, relative to the range finder, will not have associated range data from that particular range finder. FIG. 8 illustrates a blind spot 860 behind a house 830.

Method 2400 also includes, at 2450, displaying or highlighting blind spots on the map. Method 2400 may also display blind spots on a plot, on a side-view image, on a 3D image, or on other types of images that can be associated with the range data and a geo-located position. FIG. 4 is an example illustration of a blind spot displayed on a side-view of a scene. Hill 420 blocks the LOS from the PVIS 410. FIG. 5 is an example illustration of a blind spot illustrated on a contour map overhead view of the same scene illustrated in FIG. 4. FIG. 4 and FIG. 5 both illustrate multiple elevation scans at a single azimuth. FIG. 6 is an example illustration of a contour map of the same scene presented in FIG. 4 and FIG. 5. FIG. 6 illustrates multiple elevation scans at three different azimuths. FIG. 6 displays a blind spot 610.

Method 2400 also includes, at 2460, accessing a panoramic image. Accessing a panoramic image may include accessing a panoramic image or a composite panoramic image generated by the PVIS, or accessing an image provided by another imaging system.

Method 2400 also includes, at 2470, indicating (e.g., highlighting) blind spots on the panoramic image. The panoramic image may be displayed on a GUI on a laptop computer, a desktop computer, a tablet computer, a smartphone, a multifunction display, or on a different display. FIG. 7 illustrates a panoramic image 700 generated by a PVIS. Panoramic image 700 includes a hill 715 and a house 725. A blind spot behind the hill 715 is indicated by arrows 710. A blind spot behind the house 725 is indicated by arrows 720. Blind spots may be indicated using other techniques. For example, a blind spot may be outlined in a different color, the object that causes the blind spot may be highlighted in a different color or may be presented at a different intensity. A user may query the display for range information or other information about the blind spot.

In one embodiment, method 2400 may compute a first blind spot area. Method 2400 may compute an area of a first set of blind spots associated with a first location. Method 2400 may select a second location for which a range finder is to acquire range information. Method 2400 may virtually establish a second range finder at the second location. Method 2400 may determine a second blind spot based, at least in part, on the second location. Method 2400 proceeds by computing an area of a second set of blind spots. Method 2400 then determines the difference in area between the area of the first set of blind spots and the second set of blind spots. Method 2400 may, upon determining that the area of the second set of blind spots is less than the area of the first set of blind spots, display the second set of blind spots and the second location on the map, or communicate the second location to a user. Method 2400 may also indicate, on a display, area information about the second blind spot, or information about the second location. Method 2400 thus facilitates optimizing the area that a PVIS may effectively surveil, while minimizing blind spots.

In one example, a method may be implemented as computer executable instructions. Thus, in one example, a computer-readable medium may store computer executable instructions that if executed by a machine (e.g., processor) cause the machine to perform method 2200, method 2300, or method 2400. While executable instructions associated with method 2200, method 2300, and method 2400 are described as being stored on a computer-readable medium, it is to be appreciated that executable instructions associated with other example methods described herein may also be stored on a computer-readable medium.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, refers to computer hardware or firmware, and/or combinations of each to perform a function(s) or an action(s), and/or to cause a function or action from another logic, method, and/or system. Logic may include, for example, an instruction controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, or a bit stream, that can be received, transmitted and/or detected.

"User", as used herein, includes but is not limited to one or more persons, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Gamer. A Dictionary of Modem Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A panoramic view imaging system (PVIS), comprising:
   a visual light frame acquisition assembly comprising a lens and a sensor, where the visual light frame acquisition assembly produces a frame from light in a visible spectrum, where the light in the visible spectrum is acquired passively from a scene;
   a rotational position controller that pans the visual light frame acquisition assembly through a range of horizontal imaging positions;
   a rotational position encoder that produces data describing a rotational position at which light for the frame is acquired;
   an elevation position controller that tilts the visual light frame acquisition assembly through a range of vertical imaging positions;
   an elevation position encoder that produces data describing an elevation position at which light for the frame is acquired;
   a zoom controller that changes the focal length of the visual light frame acquisition assembly;
   an image processor that produces a panoramic image from a plurality of frames produced by the visual light frame acquisition assembly; and
   a range apparatus that produces range information for a plurality of locations in the frame;
   where the plurality of frames are acquired under varying operating parameters including horizontal position, vertical position, target grid co-ordinates, pitch, yaw, field of view, focal length, depth of field, light intensity, angle of light, temperature, humidity, atmospheric pressure, pan rate, tilt rate, change in pan rate, or change in tilt rate,
   where the panoramic image has a field of view greater in both a horizontal dimension and a vertical dimension than a single frame acquired by the visual light frame acquisition assembly,
   where the panoramic image is produced without using a hemispherical mirror or a fisheye lens, and
   where range information is associated with a plurality of locations in the panoramic image.

2. The panoramic view imaging system of claim 1,
   where the visual light frame acquisition assembly produces frames at a rate of at least sixty frames per second,
   where the range of horizontal imaging positions is three hundred and sixty degrees, and where the range of vertical imaging positions is at least one hundred and eighty degrees,
   where the image processor corrects or de-warps the frame based, at least in part, on calibration data associated with the lens or sensor,
   where the image processor produces a strip of frames from two or more frames acquired by the visual light frame acquisition assembly, where producing the strip of frames includes:
      producing an initial positioning of the two or more frames based, at least in part, on information from the rotational position encoder or the elevation position encoder, and
      producing a refined positioning of the two or more frames based, at least in part, on pattern matching of an item visible in overlapping portions of the two or more frames, and
   where the image processor produces the panoramic image from two or more strips of frames by:
      producing an initial position of the two or more strips of frames based, at least in part, on information from the rotational position encoder or the elevation position encoder, and
      producing a refined positioning of the two or more strips of frames based, at least in part, on pattern matching of an item visible in the overlapping portions of the two or more strips of frames.

3. The panoramic view imaging system of claim 1, comprising:
   a second frame acquisition assembly comprising a second lens and a second sensor, where the second frame acquisition assembly produces a plurality of second frames from electromagnetic radiation in a spectrum outside the visible spectrum,
   where the second frame acquisition assembly produces second frames at a rate of at least sixty images per second,
   where the electromagnetic radiation in the spectrum outside the visible spectrum is acquired passively from the scene, and
   where the image processor produces a combined panoramic image from the first panoramic image and the second panoramic image.

4. The panoramic view imaging system of claim 3, where the spectrum outside the visible spectrum is in the infrared (IR) range, the near IR (NIR) range, the short wave IR (SWIR) range, the mid wave IR (MWIR) range, or the long wave IR (LWIR) range.

5. The panoramic view imaging system of claim 1, where the range apparatus has access to range information for a plurality of locations in the frame, where the range information is associated with a virtual spherical wire-grid of the scene, and where the range apparatus enhances the panoramic image based, at least in part, on the range information.

6. The panoramic view imaging system of claim 5, where the range apparatus produces a movement alert upon detecting a change in a range associated with an object in a first instance of a first frame acquired at a first time and a second instance of the first frame acquired at a second time.

7. The panoramic view imaging system of claim 1, where the range apparatus:
   accesses a two-dimensional map of a region represented in the panoramic image, where the two-dimensional map includes a plurality of geo-locations;
   associates range information associated with a location in the panoramic image with a geo-location in the two-dimensional map based, at least in part, on information from the rotational position encoder and information from the elevation position encoder; and
   upon determining that a first geo-location in the two-dimensional map is not associated with range information associated with a location in the panoramic image:
      designates the first geo-location as a first blind spot;
      indicates, on the two-dimensional map, the first blind spot; and
      indicates, on the panoramic image, the first blind spot.

8. The panoramic view imaging system of claim 7, where the range apparatus:

computes an area for the first blind spot; and
determines a second location for which the range apparatus is to acquire range information, where the second location results in a second blind spot with a different area than the first blind spot.

9. The panoramic view imaging system of claim 8, where the range apparatus:
indicates, on the two-dimensional map, on the combined panoramic image, or on a graphical user interface (GUI), the second blind spot, area information about the second blind spot, area information about the first blind spot, or location information about the second location.

10. The panoramic view imaging system of claim 1, where the range apparatus:
detects a surface-sky interface in the panoramic image;
designates a point in the panoramic image as sky; and
assigns a default range value, a user defined range value, or an automatically determined range value, to the point in the panoramic image designated as sky.

11. The panoramic view imaging system of claim 10, where the range apparatus automatically detects the surface-sky interface using a threshold filter applied to an infrared (IR) image of the scene represented in the panoramic image, or by using global positioning system (GPS) data, where the IR image is the second panoramic image.

12. The panoramic view imaging system of claim 1, where the range apparatus constructs a virtual wire-frame model of the scene based, at least in part, on the range information, where a vertex in the wire-frame model corresponds to range information for a location in the frame.

13. The panoramic view imaging system of claim 5, where the range apparatus, upon determining that a location in the frame does not have range information:
estimates range information for the location in the frame.

14. The panoramic view imaging system of claim 13, where the range apparatus estimates range information for the location in the frame using a flat-earth model, using user-supplied elevation data, or by using linear interpolation based on a location in the frame for which there is range information.

15. The panoramic view imaging system of claim 1, where the range apparatus:
upon determining that a range associated with a first location in the frame and a range associated with a second location in the frame differ by more than a range difference threshold:
computes a rotational position and a tilt position for a third location in the frame that bisects the first location and the second location;
acquires range information for the third location;
upon determining that an angular location associated with the third location differs from an angular location associated with the first location or an angular location associated with the second location by more than an angular distance threshold:
selects a location from among the first location and the second location that has the lower angular difference from the third location;
acquires range information from the location in the frame that has the lower angular difference from the third location; and
selectively adapts the range information associated with the plurality of locations in the panoramic image based, at least in part, on the range information for the third location.

16. The panoramic view imaging system of claim 1, where range information associated with the plurality of locations in the panoramic image is stored in a data structure, and where a user may access range information associated with a location in the panoramic image from the data structure without controlling the range apparatus to acquire new range information.

17. A panoramic imaging camera, comprising:
a first camera comprising a lens and a sensor, where the first camera produces frames from electromagnetic radiation in a first spectrum, where the electromagnetic radiation in the first spectrum is acquired passively, where a frame includes a pixel;
a second camera comprising a lens and a sensor, where the second camera produces frames from electromagnetic radiation in a second, different spectrum, where the electromagnetic radiation in the second spectrum is acquired passively, where a frame includes a pixel;
a range finding apparatus mounted co-axially with the first camera or the second camera;
a positioning apparatus configured to pan and tilt the panoramic imaging camera and the range finding apparatus, and to provide data about a pan and tilt orientation associated with the first camera or the second camera when a frame is acquired by the first camera or by the second camera, or to provide data about a pan and tilt orientation associated with the range finding apparatus;
a processor;
a memory;
a set of logics; and
a hardware interface that connects the processor, the memory, the first camera, the second camera, the range finding apparatus and the set of logics;
the set of logics comprising:
a frame logic that produces an individual frame based on electromagnetic radiation acquired by the first camera or by the second camera;
a strip logic that produces a strip of frames pieced together from a plurality of individual frames produced by the frame logic;
a panorama logic that produces a panoramic image pieced together from two or more strips of frames produced by the strip logic;
a range logic that produces range information for a plurality of locations in the panoramic image; and
a line of sight (LOS) logic that produces line of sight (LOS) information based on the range information.

18. The panoramic imaging camera of claim 17, where the frame logic de-warps the individual frame before providing the individual frame to the strip logic;
where the strip logic produces the strip of frames by positioning individual frames produced by the frame logic in the strip of frames based on a pan and tilt orientation associated with the individual frame as provided by the positioning apparatus, and then selectively repositioning individual frames in the strip of frames based on edge detection pattern matching in regions where adjacent frames in the strip of frames overlap; and
where the panorama logic produces the panoramic image by positioning individual strips of frames produced by the frame logic in the panoramic image based on a pan and tilt orientation associated with one or more individual frames in the strips of frames as provided by the positioning apparatus, and then selectively repositioning individual strips of frames in the panoramic image based on edge detection pattern matching in regions where adjacent frames in the strips of frames overlap.

19. The panoramic imaging camera of claim 18, where the panorama logic adds, to the panoramic image, detail information about a portion of the scene depicted in the panoramic image, where the detail information is based, at least in part, on the range information.

20. The panoramic imaging camera of claim 18, where the panorama logic changes the panoramic image to include an image based on imagery data acquired from a different panoramic imaging camera.

21. The panoramic imaging camera of claim 20, where the panorama logic changes the panoramic image by removing an object that occludes a blind spot and by adding imagery of the blind spot, where the object that occludes the blind spot is identified based, at least in part, on the line of sight information or the range information.

22. The panoramic imaging camera of claim 21, where the range logic:
    acquires range data for a point in an individual frame using the range finding apparatus, where the range finding apparatus is positioned according to data about the pan and tilt orientation associated with the first camera or the second camera acquired when the individual frame was acquired;
    associates the range data with a pixel in the individual frame; and
    upon determining that a second pixel in the individual frame does not have associated range data:
        generates range data for the second pixel by estimating range data for the second pixel, or by interpolating range data for the second pixel based on range data for other, different pixels in the individual frame;
    generates an improved panoramic image, where the improved panoramic image is associated with range data associated with a pixel in the individual frame; and
    displays the improved panoramic image.

23. The panoramic imaging camera of claim 22, where range data associated with the improved panoramic image is stored in a data structure separate from the improved panoramic image, or is embedded in the improved panoramic image, and where the range logic accesses the range data in the data structure or embedded in the improved panoramic image without controlling the range logic to re-acquire range data.

24. The panoramic imaging camera of claim 23, where the LOS logic:
    accesses a map associated with the scene represented in the panoramic image;
    converts the range data to a geo-location on the map;
    computes a blind spot, where a blind spot is a location on the map for which the range logic has not acquired range data;
    generates an improved map, where the improved map indicates the blind spot;
    generates an updated improved panoramic image, where the updated improved panoramic image indicates the blind spot; and
    displays, on a GUI, the improved map or the updated improved panoramic image.

25. A computerized method, comprising:
    acquiring a first frame from a panoramic view imaging system (PVIS), where the first frame is acquired at a first pan and tilt orientation;
    acquiring range information for one or more locations in the first frame;
    selectively estimating range information for one or more additional locations in the first frame;
    de-warping the first frame;
    acquiring a second frame from the PVIS, where the second frame is acquired at a second pan and tilt orientation;
    acquiring range information for one or more locations in the second frame;
    selectively estimating range information for one or more additional locations in the second frame;
    de-warping the second frame;
    stitching together a composite image from the first frame and the second frame, where the composite image has a greater field of view than either the first frame or the second frame, where range information associated with a plurality of locations in the composite image is embedded in the composite image, or stored in a data structure separate from the composite image;
    correcting the composite image; and
    displaying the composite image.

26. The computerized method of claim 25, where the range information is acquired using a laser range finder.

27. The computerized method of claim 26, where stitching together the composite image includes:
    positioning the first frame and the second frame with respect to each other based on the first pan and tilt orientation and the second pan and tilt orientation, and
    repositioning the first frame and the second frame with respect to each other based on pattern matching in a region where the first frame and the second frame overlap, where the pattern matching is based, at least in part, on the range information.

28. The computerized method of claim 27, where selectively estimating range information for one or more additional locations in the first frame or one or more additional locations in the second frame includes estimating range information using a flat-earth model, estimating range information from user-supplied elevation data, or estimating range information using interpolation, where the interpolation is based, at least in part, on range information associated with one or more locations in the first frame or one or more locations in the second frame.

29. The computerized method of claim 28, where the interpolation is linear interpolation, polynomial interpolation, spline interpolation, nearest neighbor interpolation, trigonometric interpolation, multivariate interpolation, or a Gaussian process.

30. The computerized method of claim 29, comprising accessing the range information associated with the plurality of locations from the data structure or the composite image without controlling the laser range finder to re-acquire range information.

31. The computerized method of claim 30, the method comprising:
    generating, based on range information for one or more locations in a plurality of frames, a set of waypoints to follow in an imaging path, where a waypoint has a pan and tilt orientation, where a range associated with a waypoint is within a threshold range;
    controlling the PVIS to acquire a third frame from a waypoint in the set of waypoints;
    controlling the range finder to acquire range information from one or more locations in the third frame;
    selectively estimating range information for a location in the third frame; and
    updating the composite image or the data structure based, at least in part, on the third frame.

32. A computerized method for line of sight (LOS) blind spot analysis, comprising:
    establishing a range finder at a location, where the location has an absolute location or a relative location;
    defining a set of points to scan for range information with the range finder, where the set of points is defined by an azimuth range, an azimuth resolution, an elevation range, and an elevation resolution, where the set of points is oriented on the location;

acquiring range information for a first point in the set of points, where the range information is acquired at a first azimuth and a first elevation;

acquiring range information for a second point in the set of points, where the range information is acquired at a second azimuth and a second elevation;

computing the difference between a range associated with the first point, and a range associated with the second point;

upon determining that a difference between the range associated with the first point and the range associated with the second point is greater than a range threshold:
 computing an azimuth and an elevation for a third point that bisects the first point and the second point;
 acquiring range information for the third point;

computing an angular difference between the third point and the first point, and the third point and the second point;

upon determining that the angular difference between the third point and the first point or the third point and the second point is greater than an angular resolution threshold:
 selecting a point from among the first point and the second point that has the lower angular difference from the third point; and
 acquiring range information from the point that has the lower angular difference from the third point;

accessing a panoramic image acquired from a panoramic view imaging system (PVIS), where the panoramic image is acquired over the set of points, where the panoramic image includes a set of frames, where a frame is acquired at a point in the set of points, where a frame includes a pixel;

generating an associated range data by associating a range data for a point in the set of points with a position in the panoramic image, where the range data and the position in the panoramic image were acquired at the same azimuth and elevation;

upon determining that a first position in the panoramic image does not have an associated range data:
 generating an associated range data for the first position by interpolating a range value for the first position from a set of positions that have associated range data; and storing the associated range data in a data structure.

33. The method of claim 32, comprising:
accessing a map of a region in which the range finder is located, where the map has a geo-located position associated with the location;
converting an associated range data to a geo-located position;
plotting the geo-located position of the associated range data on the map;
upon determining that a position on the map does not have an associated geo-located range data:
 designating the position that does not have an associated geo-located range data as a blind spot;
displaying the blind spot on the map; and
indicating the blind spot on the panoramic image.

34. The method of claim 33, comprising:
computing an area of a first set of blind spots associated with the location;
selecting a second, different location;
virtually establishing a second range finder at the second location;
determining a second blind spot based, at least in part, on the second location;
computing an area of a second set of blind spots;
upon determining that the area of the second set of blind spot is less than the area of the first set of blind spots:
 displaying the second set of blind spots and the second location on the map; and
 communicating, to a user, the second, different location.

* * * * *